(12) United States Patent
Narlikar et al.

(10) Patent No.: US 11,574,145 B2
(45) Date of Patent: Feb. 7, 2023

(54) CROSS-MODAL WEAK SUPERVISION FOR MEDIA CLASSIFICATION

(71) Applicant: GOOGLE LLC, Mountain View, CA (US)

(72) Inventors: Girija Narlikar, Mountain View, CA (US); Abishek Sethi, Mountain View, CA (US); Sahaana Suri, Mountain View, CA (US); Raghuveer Chanda, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 389 days.

(21) Appl. No.: 16/917,160

(22) Filed: Jun. 30, 2020

(65) Prior Publication Data

US 2021/0406601 A1 Dec. 30, 2021

(51) Int. Cl.
*G06K 9/62* (2022.01)
*G06F 16/45* (2019.01)
*G06N 20/00* (2019.01)
*G06V 30/10* (2022.01)

(52) U.S. Cl.
CPC ........... *G06K 9/6257* (2013.01); *G06F 16/45* (2019.01); *G06K 9/6232* (2013.01); *G06K 9/6268* (2013.01); *G06N 20/00* (2019.01); *G06V 30/10* (2022.01)

(58) Field of Classification Search
CPC .. G06K 9/6257; G06K 9/6232; G06K 9/6268; G06F 16/45; G06F 16/55; G06F 16/75; G06N 20/00; G06N 3/0445; G06N 3/0454; G06N 3/08; G06V 30/10; G06V 30/19; G06V 10/7784; G06V 10/82
See application file for complete search history.

(56) References Cited

U.S. PATENT DOCUMENTS

| | | | |
|---|---|---|---|
| 8,495,680 B2 * | 7/2013 | Bentolila | G06Q 30/0255 725/9 |
| 11,100,373 B1 * | 8/2021 | Crosby | G06K 9/6256 |
| 2016/0323221 A1 * | 11/2016 | Martell | H04L 51/10 |
| 2019/0028766 A1 * | 1/2019 | Wold | G06F 21/10 |

(Continued)

OTHER PUBLICATIONS

Suri et al., "Leveraging Organizational Resources to Adapt Models to New Data Modalities", Proceedings of the VLDB Endowment, vol. 12, No. xxx, 2019, pp. 1-15 (15 pages).

*Primary Examiner* — John B Strege
(74) *Attorney, Agent, or Firm* — Marshall, Gerstein & Borun LLP

(57) ABSTRACT

Methods, systems, and storage media for classifying content across media formats based on weak supervision and cross-modal training are disclosed. The system can maintain a first feature classifier and a second feature classifier that classifies features of content having a first and second media format, respectively. The system can extract a feature space from a content item using the first feature classifier and the second feature classifier. The system can apply a set of content rules to the feature space to determine content metrics. The system can correlate a set of known labelled data to the feature space to construct determinative training data. The system can train a discrimination model using the content item and the determinative training data. The system can classify content using the discrimination model to assign a content policy to the second content item.

20 Claims, 10 Drawing Sheets

(56) References Cited

U.S. PATENT DOCUMENTS

| | | | |
|---|---|---|---|
| 2020/0357143 A1* | 11/2020 | Chiu | G06T 7/97 |
| 2021/0012061 A1* | 1/2021 | Chen | G06N 3/08 |
| 2021/0233259 A1* | 7/2021 | Wang | G06N 3/08 |
| 2021/0297498 A1* | 9/2021 | Divakaran | G06N 3/0454 |
| 2021/0357767 A1* | 11/2021 | Fuerst | G06N 3/0427 |
| 2021/0374947 A1* | 12/2021 | Shin | G06N 3/0454 |
| 2022/0116402 A1* | 4/2022 | Chai | G06Q 50/01 |

\* cited by examiner

CROSS-MODAL WEAK SUPERVISION FOR MEDIA CLASSIFICATION

BACKGROUND

In a computer networked environment such as the internet, third-party content providers provide third-party content items for display on end-user computing devices. These third-party content items, can be displayed on a web page associated with a respective publisher. These third-party content items can include content identifying the third-party content provider that provided the content item. Content can exist in a range of formats, including text, audio, video, or some combination thereof. However, appropriate classification of content across different media formats can be challenging, computationally intensive, and require specially trained models using manually curated training sets. The use of manual labelling processes in training models specialized to certain media formats is time consuming and produces inconsistent results.

SUMMARY

The technical solution described herein can automatically identify and classify content having new or complex media formats or modalities using weakly supervised machine-learning techniques. By leveraging pre-existing feature extraction and classification models to train one or more classification models for new content modalities. To train the classification models for the new modalities, this technical solution can automatically correlate and label previously unlabeled content across complex formats. These techniques can be applied to video content, audio content, text content, or any combination thereof. Using feature extraction models, various features can be identified and extracted from content making up the new content modality. A content modality may include portions of video, text, images, or other information. By leveraging existing classifiers for well-known data modalities, this technical solution can identify, extract, and classify features of unknown or new modalities (e.g., combination of media formats, such as a social media post having video, text, images, user information, metadata, etc.). The extracted features can be correlated with previously identified and classified content with similar features to automatically curate and label and training data. This training data can then be used to train a classifier for the new content modality automatically, without using manual labelling processes or manual curation of training data.

At least one aspect of this technical solution is generally directed to a method for classifying content across media formats based on weak supervision and cross-modal training. The method may include maintaining, in a database, a first feature classifier that classifies features of content having a first media format, and a second feature classifier that classifies features of content having a second media format. The method may include extracting a first portion of content having the first media format and a second portion of content having the second media format from a content item. The method may include identifying a first feature in the first portion of content using the first feature classifier and a second feature in the second portion of content using the second feature classifier. The method may include constructing a feature space for the content item based on the first identified feature and the second identified feature. The method may include correlating a set of known labelled data to the feature space and aggregated content statistics to construct determinative training data. The method may include training a discrimination model using the content item and the determinative training data. The method may include assigning a content policy to a second content item using the discrimination model block presentation of the second content item in a context that does not satisfy the content policy.

In some implementations of the method, correlating the set of known labelled data to the feature space may further include extracting a second feature space from a third content item using the first feature classifier and the second feature classifier. In some implementations of the method, training the discrimination model may further include combining the second feature space with the first feature space to generate an aggregated feature space. In some implementations of the method, training the discrimination model may further include applying a set of conditional instructions to the content item to determine aggregated content metrics. In some implementations of the method, training the discrimination model may further include correlating the set of known labelled data to the aggregated feature space, the aggregated content metrics, and aggregated content statistics to construct the determinative training data.

In some implementations of the method, constructing the feature space may further include extracting a first set of features from the content item using the first classification model. In some implementations of the method, training the discrimination model may further include extracting a second set of features from the content item using the second classification model. In some implementations of the method, training the discrimination model may further include constructing the feature space using the first set of features and the second set of features.

In some implementations of the method, maintaining the first feature classifier and the second feature classifier may further include receiving first labelled training data having the first media format and associated with a first feature. In some implementations of the method, training the discrimination model may further include receiving second labelled training data having the second media format and associated with a second feature. In some implementations of the method, training the discrimination model may further include training the first feature classifier using the first labelled training data, and the second feature classifier using the second training data. In some implementations of the method, training the discrimination model may further include storing the first feature classifier and the second feature classifier in the database.

In some implementations, the method may further include identifying a first text portion of the content item. In some implementations of the method, training the discrimination model may further include matching the first text portion of the content item to a set of conditional instructions to determine that a feature is present in the content item. In some implementations of the method, the content rule may be associated with the feature. In some implementations, the method may further include updating the feature space based on the determination that the feature may be present in the content item.

In some implementations of the method, training the discrimination model may further include constructing an input vector using the determinative training data. In some implementations of the method, training the discrimination model may further include associating the input vector with an expected output value. In some implementations of the method, training the discrimination model may further include propagating the input vector through the discrimination model to generate a training output value. In some implementations of the method, training the discrimination model may further include updating the discrimination model based on the difference between the training output value and the expected output value.

In some implementations of the method, constructing the feature space may further include extracting text information from the content item using optical character recognition. In some implementations of the method, constructing a feature space from the content item may further include extracting the feature space responsive to applying the text information to the first feature classifier.e.

At least one other aspect of this technical solution relates to a system for classifying content across media formats based on weak supervision and cross-modal training. The system may include one or more hardware processors configured by machine-readable instructions. The system can maintain, in a database, a first feature classifier that classifies features of content having a first media format, and a second feature classifier that classifies features of content having a second media format. The system can extract a first portion of content having the first media format and a second portion of content having the second media format from a content item. The system can identify a first feature in the first portion of content using the first feature classifier and a second feature in the second portion of content using the second feature classifier. The system can construct a feature space for the content item based on the first identified feature and the second identified feature. The system can correlate a set of known labelled data to the feature space, the content metrics, and aggregated content statistics to construct determinative training data. The system can train a discrimination model using the content item and the determinative training data. The system can assign a content policy second content item using the discrimination model to block presentation of the second content item in a context that does not satisfy the content policy.

In some implementations of the system, correlating the set of known labelled data to the feature space may further include extracting a second feature space from a third content item using the first feature classifier and the second feature classifier. In some implementations of the system, training the discrimination model may further include combining the second feature space with the first feature space to generate an aggregated feature space. In some implementations of the system, training the discrimination model may further include applying a set of conditional instructions to the content item to determine aggregated content metrics. In some implementations of the system, training the discrimination model may further include correlating the set of known labelled data to the aggregated feature space, the aggregated content metrics, and aggregated content statistics to construct the determinative training data.

In some implementations of the system, extracting the feature space from the content item may further include extracting a first set of features from the content item using the first classification model. In some implementations of the system, training the discrimination model may further include extracting a second set of features from the content item using the second classification model. In some implementations of the system, training the discrimination model may further include constructing the feature space using the first set of features and the second set of features.

In some implementations of the system, maintaining the first feature classifier and the second feature classifier may further include receiving first labelled training data having the first media format and associated with a first feature. In some implementations of the system, training the discrimination model may further include receiving second labelled training data having the second media format and associated with a second feature. In some implementations of the system, training the discrimination model may further include training the first feature classifier using the first labelled training data, and the second feature classifier using the second training data. In some implementations of the system, training the discrimination model may further include storing the first feature classifier and the second feature classifier in the database.

In some implementations of the system, applying a set of content rules may further include identifying a first text portion of the content item. In some implementations of the system, training the discrimination model may further include matching the first text portion of the content item to a set of conditional instructions to determine that a feature is present in the content item. In some implementations of the system. In some implementations of the system, training the discrimination model further includes updating the feature space based on the determination that the feature may be present in the content item.

In some implementations of the system, training the discrimination model may further include constructing an input vector using the determinative training data. In some implementations of the system, training the discrimination model may further include associating the input vector with an expected output value. In some implementations of the system, training the discrimination model may further include propagating the input vector through the discrimination model to generate a training output value. In some implementations of the system, training the discrimination model may further include updating the discrimination model based on the difference between the training output value and the expected output value.

In some implementations of the system, extracting a feature space from the content item may further include extracting text information from the content item using optical character recognition. In some implementations of the system, extracting a feature space from the content item may further extracting the feature space responsive to applying the text information to the first feature classifier.

At least one other aspect of this technical solution relates to a non-transitory computer-readable storage medium having instructions embodied thereon, the instructions being executable by one or more processors to perform a method for classifying content across media formats based on weak supervision and cross-modal training. The method may include maintaining, in a database, a first feature classifier that classifies features of content having a first media format, and a second feature classifier that classifies features of content having a second media format. The method may include extracting a first portion of content having the first media format and a second portion of content having the second media format from a content item. The method may include identifying a first feature in the first portion of content using the first feature classifier and a second feature in the second portion of content using the second feature classifier. The method may include constructing a feature space for the content item based on the first identified feature and the second identified feature. The method may include correlating a set of known labelled data to the feature space, the content metrics, and aggregated content statistics to construct determinative training data. The method may include training a discrimination model using the content item and the determinative training data. The method may include assigning a content policy to a second content item using the discrimination model to block presentation of the second content item in a context that does not satisfy the content policy.

In some implementations of the computer-readable storage medium, correlating the set of known labelled data to the feature space may further include extracting a second feature space from a third content item using the first feature classifier and the second feature classifier. In some implementations of the computer-readable storage medium, training the discrimination model may further include combining the second feature space with the first feature space to generate an aggregated feature space. In some implementations of the computer-readable storage medium, training the discrimination model may further include applying a set of conditional instructions to the content item to determine aggregated content metrics. In some implementations of the computer-readable storage medium, training the discrimination model may further include correlating the set of known labelled data to the aggregated feature space, the aggregated content metrics, and aggregated content statistics to construct the determinative training data.

In some implementations of the computer-readable storage medium, extracting the feature space from the content item may further include extracting a first set of features from the content item using the first classification model. In some implementations of the computer-readable storage medium, training the discrimination model may further include extracting a second set of features from the content item using the second classification model. In some implementations of the computer-readable storage medium, training the discrimination model may further include constructing the feature space using the first set of features and the second set of features.

In some implementations of the computer-readable storage medium, maintaining the first feature classifier and the second feature classifier may further include receiving first labelled training data having the first media format and associated with a first feature. In some implementations of the computer-readable storage medium, training the discrimination model may further include receiving second labelled training data having the second media format and associated with a second feature. In some implementations of the computer-readable storage medium, training the discrimination model may further include training the first feature classifier using the first labelled training data, and the second feature classifier using the second training data. In some implementations of the computer-readable storage medium, training the discrimination model may further include storing the first feature classifier and the second feature classifier in the database.

In some implementations of the computer-readable storage medium, the method may further include identifying a first text portion of the content item. In some implementations of the computer-readable storage medium, training the discrimination model may further include matching the first text portion of the content item to a set of conditional instructions to determine that a feature is present in the content item. In some implementations of the computer-readable storage medium, training the discrimination model further includes updating the content metrics based on the determination that the feature may be present in the content item.

In some implementations of the computer-readable storage medium, training the discrimination model may further include constructing an input vector using the determinative training data. In some implementations of the computer-readable storage medium, training the discrimination model may further include associating the input vector with an expected output value. In some implementations of the computer-readable storage medium, training the discrimination model may further include propagating the input vector through the discrimination model to generate a training output value. In some implementations of the computer-readable storage medium, training the discrimination model may further include updating the discrimination model based on the difference between the training output value and the expected output value.

In some implementations of the computer-readable storage medium, extracting a feature space from the content item may further include extracting text information from the content item using optical character recognition. In some implementations of the computer-readable storage medium, constructing a feature space may further include extracting the feature space responsive to applying the text information to the first feature classifier.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
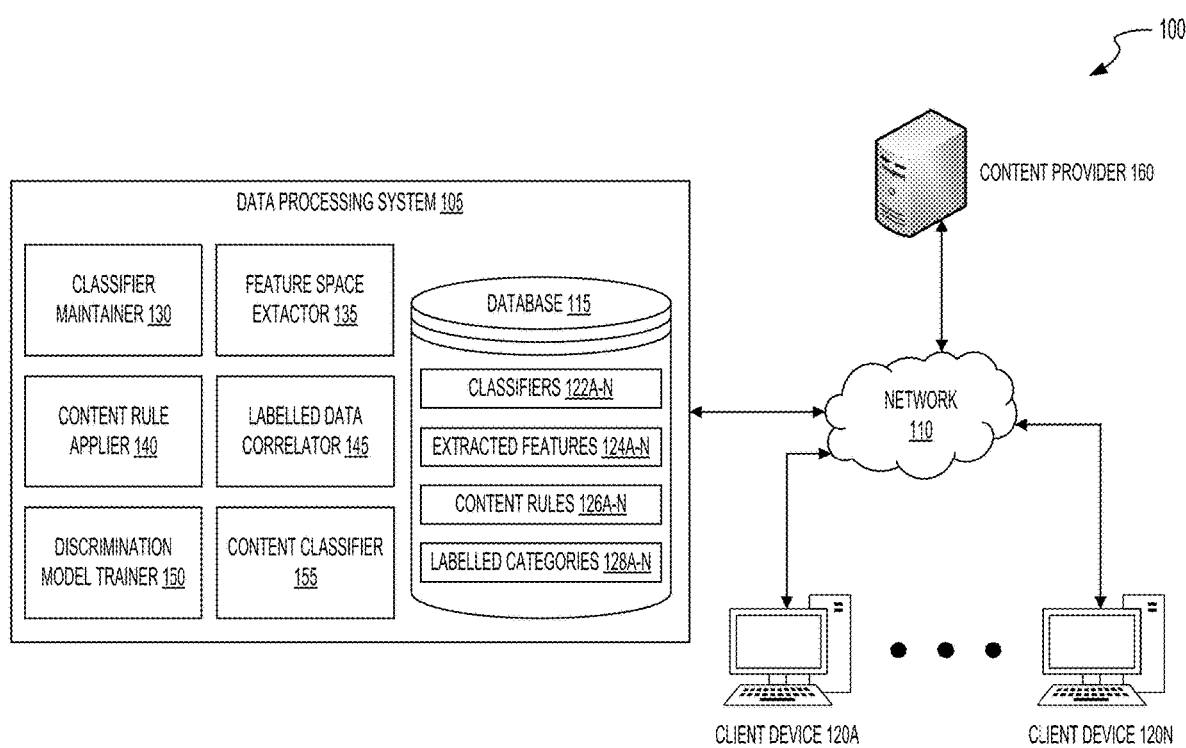
FIG. 1 illustrates a block diagram of an example system for classifying content across media formats based on weak supervision and cross-modal training.

Below are detailed descriptions of various concepts related to, and implementations of, techniques, approaches, methods, apparatuses, and systems for classifying content across media formats based on weak supervision and cross-modal training. The various concepts introduced above and discussed in greater detail below may be implemented in any of numerous ways, as the described concepts are not limited to any particular manner of implementation. Examples of specific implementations and applications are provided primarily for illustrative purposes.

Content selection is often governed in part by policies that dictate what content can be provided in a particular context. For example, content selection policies can use device information, online activity information, time and date information, interaction information, regulatory restrictions, or information resource restrictions to control what content can be displayed on a web page or application. Generally, content is classified into one or more content categories based on the features of the content. Content selection services can select content for a given context if the features for that content match those of a content policy associated with the context. In contrast, if content does not match the content policy associated with the context, the systems and methods can refrain from selecting or block presentation of that content, thereby ensuring that only appropriate content is selected for the context. Therefore, it would be beneficial for a system to analyze the features of content to automatically assign the content to an appropriate content policy.

Content can exist in a range of formats, including text, audio, video, or some combination thereof. However, appropriate classification of content across different media formats can be challenging. Content classification systems typically require machine learning models specialized to a particular media format for each type of media content. Training these models can be computationally expensive, time consuming, and suffer from a lack of appropriately labeled training data. The analysis and extraction of content features in complex media formats (e.g., video, audio, etc.) is therefore typically performed at least in part by manual labelling processes, which can be computationally inefficient and produce inconsistent results. It would therefore be advantageous for a system to implement automatic classification and identification or labeling of complex media formats while overcoming the challenges of training many classification models for each media and feature type.

The systems and methods described herein can automatically assign an appropriate content label to content having complex media formats using weakly supervised machine-learning techniques. Where other implementations use manual labelling of content features to identify and label training data for model training, the systems and methods described herein can utilize pre-existing feature extraction and classification models to train one or more classification models for a new or un-modeled content modality. The systems and methods described herein can automatically correlate and label previously unlabeled content across complex formats, which can be used to train a classification model for content of a new or un-modeled content modality or format. These techniques can be applied to video content, audio content, text content, or some combination thereof. Using feature extraction models, various predetermined features can be identified and extracted from content. The extracted features can be correlated with known labelling and classification data associated with previously identified or classified content that includes similar features. Using the automatically labelled content feature data, the systems and methods described herein can train a model to classify, identify, or label content of a new or previously un-modeled modality or format without manual intervention or supervision.

Accordingly, this technical solution provides computational improvements to content feature space extraction, classification, and labelling systems. Other implementations require manual processes to train a specialized model to extract a feature-space to classify and label a predetermined media format, and typically require steps involving manual labelling and classification. Using a separate model for each feature type and content type is inefficient because many models must be trained to accommodate for increasingly diverse content, categories, and feature types. This technical solution describes a technique that uses various feature identification and extraction models to generate a common discrimination model capable of identifying and labeling content based on a feature space that is common to all media formats. By unifying the feature space between feature extraction and content labelling and classification steps, this technical solution improves the computational performance of automatic content feature extraction, classification, and labelling. Further, the unification of the feature space between media formats allows for the automatic training of a single discrimination model to classify content of a new or previously un-modeled modality instead of manually curating and manually labelling training data to create a model for the new format. This reduces the amount of computation required to identify, label, and classify content in any given media format, and generate new models for new content formats or modalities.

As applications grow and evolve, the machine learning (ML) models that power them must adapt the same predictive tasks to data modalities that arise over the application life cycle (e.g., a video content launch in a social media application may include existing text or image models to extend to video, etc.). To solve this problem, ML pipelines are typically created from scratch. However, this can fail to utilize the large body of domain expertise and data that has been cultivated from developing tasks for existing modalities. In this technical solution, it is demonstrated that organizational resources in the form of existing services that operate over related tasks, aggregate statistics, and knowledge bases can be used to construct a common feature space that can connect data and resources across new and existing data modalities. This allows for the application methods for training data curation (e.g., weak supervision) and model training (e.g., forms of multi-modal learning) across these different data modalities. Using organizational resources at each of these pipeline steps composes at scale. This technical solution includes an example implementation that demonstrates a reduction in the time needed to develop models for new modalities.

A. Introduction

Machine learning models can be used for tasks such as content and event classification, and often adapt existing models to new data modalities (e.g., adapt from text to images or video, or across other media formats, etc.) to perform the same predictive tasks over these new modalities. Consider the following example a content moderation system (e.g., one or more of the systems described herein, etc.) can use an ML pipeline to flag policy-violating posts on a social media application (e.g., harmful speech, spam, or sensitive content, etc.). Such a system can support a variety of media formats, including video-based posts. The system can classify new video posts for the same violations as the text and image posts.

This process of adapting models to new data modalities can be generally referred to as cross-modal adaptation (e.g., a form of transductive transfer learning, etc.). Other implementations of cross-modal adaptation systems can assume points across data modalities are easily or directly linked (e.g., captions directly linked to images, or clinical notes to lab results, etc.) to leverage zero-shot learning or weak supervision. However, in one or more of the environments described herein, such direct connections may not exist, resulting in a modality gap. For example, video posts may not contain any descriptive content (e.g., text summaries), and may bear no relation to a previous post.

Other cross-modal deployments typically fail to address the modality gap and instead build a standard ML pipeline from scratch, following a three-step split architecture (e.g., the split architecture 205 illustrated in FIG. 2):

1. Feature Generation: featurize (e.g., enumerate and extract features of content, etc.) data of the new modality.

2. Training Data Curation: label data of the new modality (often via sampling and manual labeling).

3. Model Training: train a model on the labeled training data of the new modality.

This classic ML approach can take months to complete and leads to a set of disparate models with both their own feature spaces and training data dependent on data modality. In the above example, as direct translations of policy violations are unclear when moving from a static to sequential modality, models are developed from scratch. Neural network models that elide explicit feature generation are relied on, and weeks to months are spent manually labeling video data to train models to identify policy violations. While this procedure fails to leverage previously developed expertise, the general and modular split architecture allows small, easily deployable and monitored models for new tasks. However, as described herein, it is possible to bootstrap data-limited cross-modal training pipelines by augmenting the split architecture.

Despite the modality gap, auxiliary data sources can be leveraged to connect points across data modalities. These auxiliary links can be referred to as organizational resources, which can be exploited to boost the effectiveness of each pipeline step for cross-modal adaptation. Public and proprietary resources (e.g., the resources 215 illustrated in FIG. 2, etc.) can be cultivated in the form of tools or services that take existing data points as input, and return features, metadata or statistics that describe them. The techniques described herein can be applied to any new modality that may have resources or features common to data for which classifiers already exist (e.g., the classifiers 122). Systems and algorithms for systematically leveraging these classifier resources (e.g., training data, feature data, other information, etc.) for ML tasks. Leveraging resources to bridge the modality gap and improve each of the three steps of the split architecture (e.g., the improved split architecture 210 illustrated in FIG. 2 and implemented by the data processing system 105) are described.

Feature Generation: utilize resources to create common features. Overcoming the modality gap can include construct features that are common between modalities. A straightforward, yet effective means of achieving this includes identifying resources that can transform data points to representations common across modalities (e.g., in a topic modeling system that applies to text and image, the topic of the content, etc.). Accordingly, such resources can be viewed as a library of feature transformations, and pass data points of different modalities into these services and compose their outputs to form rich shared feature spaces. Such common features can be used as the foundation for improvements in the remaining two split architecture steps.

Training Data Curation: use weak supervision with label propagation. Given a common feature space, at least one approach to cross-modal adaptation includes training a model with labeled data from existing modalities using the features shared between modalities. Inference can be performed over the new data modality using the shared features. Labeled training data may be used in the new modality.

To mitigate the cost of obtaining manually labelled training data, weak supervision systems (e.g., the technical solutions described herein, etc.) are leveraged, and can use labeling functions (LFs) to programmatically label groups of data points.

Curating Structured Data and a Development Set. LFs can include the manual specification of predicates over the data that has both high precision and recall (e.g., if a text span contains the word SPAM, mark it as spam, etc.). However, specifying predicates over unstructured data like video and images may pose challenges to easily specifying what a policy-violating image looks like. Further, to evaluate the performance of candidate LFs, a labeled development set may be needed. To address these dual concerns, the solutions described herein generate a common feature space. As model outputs can be frequently categorical and quantitative (e.g., output of an object detection routine, etc.), it may be easy to define predicates over these features. In addition, labeled data of existing modalities may be used as a development set.

Creating LFs Without Domain Expertise. LFs may be traditionally constructed by experts using task expertise. However, relying on experts is inefficient and can produce inconsistent results. Further, experts may not be immediately available to develop LFs, and non-experts may not possess the requisite expertise. To address this concern, the technical solutions described herein can leverage frequent item-set mining to more quickly and easily develop LFs for the new modality. Item-set mining can include automatically identifying feature values that may occur more frequently in positive examples, which can be treated as LFs. This method of LF generation can enable mining of a labeled data corpus for existing data modalities (tens of millions) in a short period of time (e.g., seconds, minutes, etc.). In contrast, domain experts are limited to manually examining much smaller data volumes. Thus, the techniques described herein are faster and perform better than domain-expert-curated LFs.

Finding Borderline Examples. Weak supervision can mandate high precision and recall LFs that cover a majority of data points. While developing LFs to identify positive examples with high precision can be straightforward, constructing rules to identify borderline positive and negative examples, which are crucial for recall and coverage, may be challenging. In response, the techniques described herein can use label propagation to augment the automatically mined LFs. Label propagation can detect data points in the new modality that may be similar to labeled examples in the old modalities, where similarity can be defined using features in the common feature space. Such techniques can enable the identification of large volumes of negative examples, and more candidate positives than with techniques implementing pure item set mining, thereby improving overall computational performance of such systems.

Model Training: combine data and label sources. Given the common features, this technical solution describes leveraging multi-modal techniques for model training that can combine inputs from multiple data and label sources (e.g., data from new and existing modalities, manually generated labels, and labels from weak supervision, etc.). At least three such techniques for combining the features for model training are described: concatenating the features directly, concatenating embeddings independently learned for each data modality, and projecting the new modality to an embedding learned using existing modalities. Combining label and data modalities can improve end-modal performance in comparison to using any modality in isolation, and feature concatenation can outperform the alternatives.

This technical solution describes how a three-step split architecture augmented for cross-modal adaptation can address the production challenges in deploying, maintaining and evaluating ML pipelines with access to the limited but rich ecosystem of resources present in a typical industrial team.

This technical solution demonstrates how using resources to augment the split architecture can enable development of cross-modal pipelines that obtain the same classification performance as using up to 750 k fully supervised image data points by instead using unlabeled image data points, and previously manually-labeled text data points—thereby decreasing the time to develop models for cross-modal adaptation from months to days.

This technical solution describes a pipeline that can overcome the challenges of using weak supervision for cross-modal adaptation by automatically generating labeling functions up that are much faster than a domain expert, who must divide the task into days or weeks. Increased performance with respect to coverage and F1 score are obtained by the techniques described herein.

Support applications over multiple data modalities-products that may initially only support text must evolve to support richer modalities including image, videos, or animations (e.g., gifs). Machine learning (ML) models are increasingly relied on for content and event classification, and they therefore models must be developed to perform existing classification tasks over these new modalities as they arise. This problem as can be referred to as cross-modal adaptation: the techniques described herein can train a model for existing classification tasks over the new data modality quickly, when labeled data of the new modality is limited or nonexistent at the desired time of deployment. The scope of the problem can be limited by assuming that resources can be accessed to process given modalities and return structured (e.g., categorical or quantitative) outputs, and that new modalities can provide additional means of conveying of information (e.g., are as rich, or richer than existing modalities, etc.). Thus, while representative examples may be constructed based on adapting text and image tasks for video, the techniques described herein can apply to other commonly-processed modalities including audio signals, time series, point clouds, or network behavior in graphs.

Three challenges in performing cross-modal adaptation are now highlighted.

Labeling Rich Modalities. Manually labeling training data can be a labor-intensive and time-consuming procedure, especially when facing large class imbalances. Referring to a content moderation example described above, the hundreds to thousands of data points must be sampled to identify examples of sensitive content. In the cross-modal scenario, the cost of labeling richer data modalities is often greater than that of existing modalities (e.g., manually classifying text is faster than viewing and classifying video, etc.). As closely reviewing new modalities is increasingly costly, alternative ways to label data would be beneficial.

Bridging the Modality Gap. Solutions for similar cross-modal problems assume that other tasks have already been trained for the target modality, or data of different modalities are directly connected. Examples of direct connections can include images paired with captions, 2D projections of 3D point clouds, or clinical notes and lab results. In contrast, the setting considered herein often lacks these connections, resulting in a modality gap between data points that must be bridged to leverage information and resources across modalities.

Leveraging Resources Across Task, Data, and Label Source. As detailed herein, large amounts of data and expertise generated across existing tasks and data modalities may pre-exist in data stores for other purposes. In cross-modal adaptation, how to combine information across these sources are identified to train a high-performing end-model.

Richer data modalities (e.g., image or video as opposed to text, etc.) may pose a challenge at each of the classic three split architecture steps. For feature generation or selection, storage budgets are allocated that, though large, are sometimes insufficient to capture all incoming raw data. For curating training data, new modalities utilize integrated interfaces to enable manual reviewers to select and evaluate data points. Finally, ML models can have low inference latency to be deployed at scale in real-time, especially for user-facing applications; rich modalities are more expensive to process in raw feature space. A system for cross-modal adaptation can rely on efficient ways of performing storage, classification, and inference over these rich modalities, to incur minimal overhead when these modalities are released in any application.

Diverse Info Sources. Input features for various stages of the ML pipeline can be drawn from different common pre-existing services (e.g., a common service to return the text content of a post, etc.). Coordinating the input features of different models may rely on changes to underlying systems architecture if drawing from a new feature source, and necessitate population in advance. As a result, new features may not be arbitrarily added to the deployed model without a time-consuming process to compute and alter the feature set for the entire data store. In addition, not all accessible features can be served at inference time due to the cost of extracting them from their respective data sources and systems. A system for cross-modal adaptation can leverage these additional features even if they cannot be deployed and served in production.

B. Solution Overview

Described herein are techniques for cross-modal adaptation that addresses both the cross-modal and production challenges. First, an example system architecture is described (e.g., the data processing system 100). Next, a high level overview of how each pipeline component is adapted to the cross-modal setting is provided.

Given that the traditional split architecture may be preserved in part, augmentations of each step for a cross-modal setting are described below.

Feature Generation Features common to both new and existing data modalities can be generated, as described herein. Organizational resources that process data points of both modalities are identified and applied, and values in a space common between one or more modalities (as in FIG. 2) are output. These common features can be the foundation to using data across modalities in subsequent steps. This step addresses the production challenge of processing rich data modalities, and the cross-modal challenge of bridging the modality gap.

Training Data Curation. Labels for the new, unlabeled data modality can be automatically generated to develop a training dataset. To do so, weak supervision can be performed using methods for automatic labeling function creation via frequent item set mining and label propagation that leverage the shared features from the first step. This step can address the production challenge of leveraging diverse information sources, and the cross-modal challenge of decreasing labeling time for rich modalities.

Model Training. An end model can be trained using both the weakly supervised data in the new modality and fully supervised data of existing modalities. To do so, the features generated in the first step can be combined in one or more ways to construct a vector feature representation, such as: by concatenating the generated common features directly, by concatenating learned embeddings for each modality, or by projecting the new data modality to an embedding space learned from existing labeled modalities. The first approach (simple concatenation) may outperform the alternatives for certain tasks. This step can address the cross-modal challenge of combining all available resources at deployment.

C. Feature Generation

A first portion of the cross-modal pipeline is described herein. Data of a new modality (e.g., video posts) can be provided as input, and the system can train models for existing tasks. Labeled data (e.g., labelled categories 128 stored in the database 115, etc.) and models that perform these tasks for existing data modalities may be stored in one or more data repositories (e.g., as the feature classifiers 122 in the database 115, etc.). Processing unclassified or un-modeled and rich data modalities may be time and resource intensive. Techniques to overcome these hurdles are described herein, by developing structured (e.g., categorical and quantitative) features common across data modalities via organizational resources.

As ML becomes more common across domains, public and internal organizational resources in the form of services, models, statistics and heuristics are being curated by industrial product teams and labs, stand-alone companies, and academic research groups. These resources take as input data points of various modalities, and can return categorical and quantitative outputs in the form of features, class metadata and statistics that describe these data points. As a result, while models have yet to be developed for specific tasks in the new modality, the organizational resources (e.g., feature classifiers 122, content rules 126, labelled categories 128, etc.) can be applied to data points of the new modality.

Directly applying organizational resources to transform both new and existing data modalities to a common feature space can create auxiliary links between data points to bridge the modality gap. For example, consider a text and image post represented as data points x and y, respectively.

Services (e.g., feature classifiers 122) exist to detect the presence of profanity in text ($T_{profanity}$) and image posts ($I_{profanity}$), and to detect their setting ($T_{setting}$, $I_{setting}$). Applying these resources, in this example, to each data point can provide the following features (e.g., extracted features 124, and stored in the database 115) in the same feature space:

$(T_{profanity}(x), T_{setting}(x)) = (\text{True}, \text{outdoor})$ $(I_{profanity}(y), I_{setting}(y)) = (\text{False}, \text{outdoor})$ In addition, resources can be composed, or otherwise constructed or arranged, by chaining the outputs of organizational resources, as described herein below, via the video splitting and image summarization services. Features sufficient for the tasks described herein can be generated or extracted, as the first step in developing more complex embedding-based feature spaces.

Organizational resources that apply across their modalities (e.g., text, video, audio, point clouds, etc.) can be curated. As described herein below, developing systems around discovering organizational resources can alleviate the challenging burdens described above.

Some classes of organizational resources that enable transformations can be categorized as follows:

Model-Based Services. As stated herein, organizations or systems can have access to classification and data processing services that operate over their existing data modalities. Examples can include: topic models that categorize content (e.g., feature classifiers 122 and content rules 126 described herein below, etc.); motif discovery tools to transform time series to categorical patterns (e.g., feature classifiers 122 and content rules 126 described herein below, etc.); knowledge graph querying tools to extract known and related entities from data points (e.g., feature classifiers 122 and content rules 126 described herein below, etc.). The categories, patterns, or the results of various classifications can be stored in the database 115 as the labelled categories 128, as described herein below in conjunction with FIG. 1. In some implementations, each of the feature classifiers 122 can be a model that is associated with a particular set of output categories, as further described below in conjunction with FIG. 1. The labelled categories 128 can be stored in the database 115 as one or more sets of labelled categories 128, where each set is stored in association with at least one classifier 122, as further described below in conjunction with FIG. 1.

In an example implementation, topic modeling services that operate on text or image and map data points to a common set of topics or categories (e.g., settings or brands, such as labelled categories 128, etc.) are maintained, services (e.g., classifiers 122, etc.) that provide text summaries for images, and tools that split a video into representative image frames. To featurize data points for the new video data modality, the system (e.g., the data processing system 105 or its components) can extract frames from a video post to create a series of image data points using the video splitting tool. The extracted image data points can be used as input to the existing topic modeling services and the image summarizing service can generate a shared feature space between video, image, and text posts.

Aggregate Statistics and Metadata. Statistics can be collected that are relevant to a particular applications and or specified needs. Metadata can be maintained to track data points (e.g., user ID, or post ID, content ID, etc.). By leveraging metadata to connect data points, these statistics can be used to generate quantitative features across data modality.

Rule-Based Services. Heuristics and rules can be developed to make manually collecting, analyzing and labeling data more efficient. For instance, to sample candidate positive examples for training data curation in class-imbalanced scenarios, heuristics can be used to justify transitioning to automated methods like active learning.

In another example, certain keywords present in a post may indicate that the post relates to sensitive content, or that certain online behaviors are correlated with spammers (e.g., creating a new account and adding several unrelated users as friends, etc.). Such rules may be used to sample candidate training data to review for sensitive content or spam, and can similarly be applied as binary features when constructing a new feature space.

C. Training Data Curation

Once common features across data modalities are generated, a set of labeled examples for model training can be curated. One approach to do so can include directly training a model with the labeled data (e.g., labelled categories 128 described herein below, etc.) of existing modalities using the shared features (e.g., extracted features 124, described herein below). However, this technique may be inefficient in certain circumstances. Instead, leveraging existing modalities to generate training data in the target modality without additional manual labeling is proposed as a solution. This can be achieved via weak supervision (WS), which can additionally allow use of features unavailable at deployment time to curate training data. First, an introduction to WS is provided. Techniques to use a common feature space overcome three challenges in using WS for cross-modal adaptation are described.

WS can utilize cheap yet noisy labels to curate a training dataset. The techniques described herein present a framework for WS where generate labeling functions (LFs) are generated that programmatically label groups of data points. To label a set of unlabeled data points, X, unlike a classic, time-consuming labeling pipeline including manual sampling and labeling of individual data points in X, the pipeline described herein proceeds as follows:

1. Develop LFs. Small, labeled development dataset are used to create LFs. LFs can be functions that take a data point and all related features as input, and output a label or abstain (e.g., in a binary setting, an LF returns positive, negative, or abstain). In an example implementation, a sample LF may be: if a post contains excessive profanity it is harmful speech, else abstain. As in the example, while these LFs need not be perfect, the systems described herein can use both high precision and high recall LFs that each perform better than random.

2. Programmatically apply generated LFs to X. Unlike other labeling pipelines, X can be very large as labels are not human-generated. The techniques described herein can be performed on data points in X that have LFs that return labels instead of abstaining, (e.g., have high coverage, etc.).

3. Learn probabilistic labels from Step 2. The systems and methods described herein can use a generative model to estimate each LF's accuracy by evaluating correlations between them when applied to X. The estimated accuracies can be used to return a weighted combination of the weak labels applied to each data point (e.g., probabilistic labels, etc.).

Following this procedure, the probabilistic labels can be used to train an end discriminative model for the target task that operates over a noise-aware loss function.

Label generation via WS is can be an offline process—the LFs used in training can be used to generate training data, and may not be used when models are served. As a result, probabilistic training data can be generated using features that are not feasible to compute or obtain at serving time. This allows for the transfer of knowledge across data modalities during training, without requiring them at deployment time.

The systems described herein can implement WS at an industrial scale. WS can be extended for curating training data for cross-modal adaptation.

LFs can be constructed by defining predicates that operate over certain data points. This can be challenging in our setting for two reasons: first, defining predicates can be straightforward over structured feature spaces such as with text (e.g., string or pattern matchers, etc.), quantitative data (e.g., thresholds, etc.), or categorical data (e.g., checking presence of a topic or category, etc.) variables. In contrast, generating LFs over unstructured data modalities (such as image and video) can introduce challenges. For instance, lacking captions or structured metadata, existing work to detect if an image post displays a sporting event requires integration of specialized classifiers to identify the setting, players and spectators, and rules to verify that they exist together in the right ordering and locations. This can be challenging for more nuanced tasks, such as sensitive content identification. Second, as previously described, a small labeled development set may be required to both develop and validate the precision and recall of candidate LFs. In a cross-modal setting, neither of these data nor label requirements may be met.

These challenges are overcome by leveraging the common feature space induced in the first step of the pipeline, as described herein above. The structured feature space can provide categorical outputs (e.g., post setting or objects, etc.) that allow for easily defined LFs for both new and existing data modalities. Simultaneously, the shared feature space can enables the use of labeled data from existing data modalities as a development set for LF creation in the new, target modality. LFs can thus be defined over features common between existing and new modalities, and evaluated using the labeled data from existing modalities. For instance, in the moderation example, if specific topics in text or image are frequently flagged as spam, then splitting a video into image frames and running topic models on the images can enable the same LFs to apply to video.

LFs can be constructed using expertise of experts. These experts must understand how classification tasks (such as sensitive content) vary across language, country, and region, as well as how the task evolves in a new data modality. However, domain experts who can swiftly develop LFs for all of their tasks in the new data modality may be inefficient or unavailable. The techniques described herein are based on frequent item set mining to automatically generate LFs that are easier to implement and outperformed experts.

To construct an LF, combinations of features that occur more often in positive examples than negatives, and vice versa, can be identified. First, feature values are selected that—when used as a labeling function—meet pre-specified precision and recall thresholds over the labeled development set of existing modalities. Higher order feature combinations can successively added when they meet the threshold, as in the Apriori algorithm. To minimize excessive correlations across LFs, each LF can be constructed as a conjunction of feature values identified by the mining procedure, defined over a single feature. To improve runtime performance in common class-imbalanced scenarios, candidate feature values can be mined in the positive examples. This approach is similar to performing difference detection and explanation in large scale data, instead used to generate LFs.

Weak supervision can utilize positive and negative LFs with high precision, recall, and coverage. Domain experts have difficulty creating high recall LFs and LFs that capture the behavior of negative examples; consequently, their generated LFs are often lacking in coverage. This occurs as it is often straightforward to develop high precision rules that describe "easy" examples in the positive class, since a few basic modes are typically well defined (e.g., excessive profanity for identifying harmful speech). In contrast, the behavior of more ambiguous positives, and of the negative class is typically vast and unspecified—especially in a class imbalanced setting. This challenge is overcome by leveraging common features to automatically identify data points in the new modality that are "similar" to positive and negative examples in previous data modalities.

To identify points similar to labeled negatives, label propagation over a graph induced by the created common feature representation is used (e.g., by the data processing system 105 or any of its components). In this graph, each vertex can represent a data point, and edges between data points can be constructed based on features shared between them, where these features can be either categorical or quantitative. The edges between data points can be weighted based on the similarities between their feature representations. These weights can be determined either based on the number of shared feature values between them if the features are categorical, or based on a pre-specified distance metric if the features are quantitative.

The algorithm can propagate the labels of data points of existing modalities to neighboring unlabeled points of the new modality using this graph structure. An unlabeled data point that shares edges with labeled data points can be assigned a weighted combination of its neighbor's labels. The algorithm can iteratively update this assignment until convergence, and return the final weighted score. This score can be used as part of a threshold-based LF. Similar to generating normal LFs, this threshold can be selected using a development set in the target modality. However, in the cross-modal setting, a development set consisting of labeled examples in existing modalities can be leveraged.

Unlike LFs generated via item set mining, label propagation can leverage features that may be difficult to construct LFs with as long as a distance metric can be defined over them. Thus, features specific to the new modality to construct edges can be used, including unstructured features such as image embeddings. Note that label propagation may be too computationally intensive to run at model deployment time. This non-servable information can still be leveraged for training data curation to boost end-model performance.

D. Model Training

Following the curation of labeled training data, a model for classification can be trained. The goal is to leverage information across all of the modalities and label sources that were generated to train a better model for the new data modality. This can be achieved via multi-modal techniques to jointly train over new and existing data modalities and label sources.

Early Fusion. The features of all data modalities can be merged to create a single common representation. Features shared by all data modalities are merged into a single field (e.g., raw text from text posts, and captions derived from image data points), and features specific to certain data modalities are left empty for those that do not have these features present (e.g., image-specific embeddings may not be present in text data). Data modalities and label sources can then be jointly trained.

Intermediate Fusion. An embedding for each data modality can be learned, and these embeddings can be concatenated as input to a final, jointly trained model. Training can proceed in two passes over the training data. In the first stage, independent models can be created for each data modality. In the second stage, the final prediction layer (e.g., softmax) can be removed from each of these models. A second pass over all of the data can then be performed, where the shared features are passed into all models in which they exist. The model outputs can be concatenated to create a new feature embedding. This embedding can be used as input to a final model for training. Construction of this architecture is motivated by the fact that data modalities with fewer data points may get overpowered in the early fusion model. By training each modality independently prior to concatenation, this can be alleviated.

Other Fusion. An embedding using existing data modalities can be learned, and then project data points from the new modality to the embedding space for classification. First, a model A can be trained over existing data modalities as in early fusion. This model is then "frozen," so none of its parameters change. Next, a model B can be trained over the weakly supervised data of the new modality. In the final training stage, we pass points of the new modality to B and simultaneously pass the shared features between the existing and new modalities as input to A, and compute the model outputs prior to the final prediction (e.g., softmax) layer of both A and B, which we denote X and Y, respectively. We then train a "projection layer" P to match Y with X. At inference time, we pass incoming data points through B and the projection layer P, and use the final prediction layer of the initially trained, frozen A.

The foregoing solution can be carried out, for example, by the components of system 100, including the data processing system 105 (and the components thereof) described herein below in conjunction with FIG. 1.

Referring now to FIG. 1, illustrated is a block diagram of an example system 100 for classifying content across media formats based on weak supervision and cross-modal training, in accordance with one or more implementations. The system 100 can include at least one data processing system 105, and at least one network 110, at least one client device 120A-N (sometimes generally referred to as client devices 120 or client device 120), and at least one database 115. The data processing system 105 can include at least one classifier maintainer 130, at least one feature space extractor 135, at least one content rule applier 140, at least one labelled data correlator 145, at least one discrimination model trainer 150, at least one content classifier 155. The data processing system 105 can include at least one database 115. The database 115 can include at least one classifiers 122A-N (sometimes referred to as classifiers 122 or classifier 122), at least one extracted features 124A-N (sometimes referred to as extracted features 124 or extracted feature 124), at least one content rules 126A-N (sometimes referred to as content rules 126 or content rule 126), and at least one labelled categories 128A-N (sometimes referred to as labelled categories 128 or labelled category 128). In some implementations, the database 115 can be external to the data processing system 105, and the data processing system 105 or its components can query the database 115 via the network 110.

Figure 10:
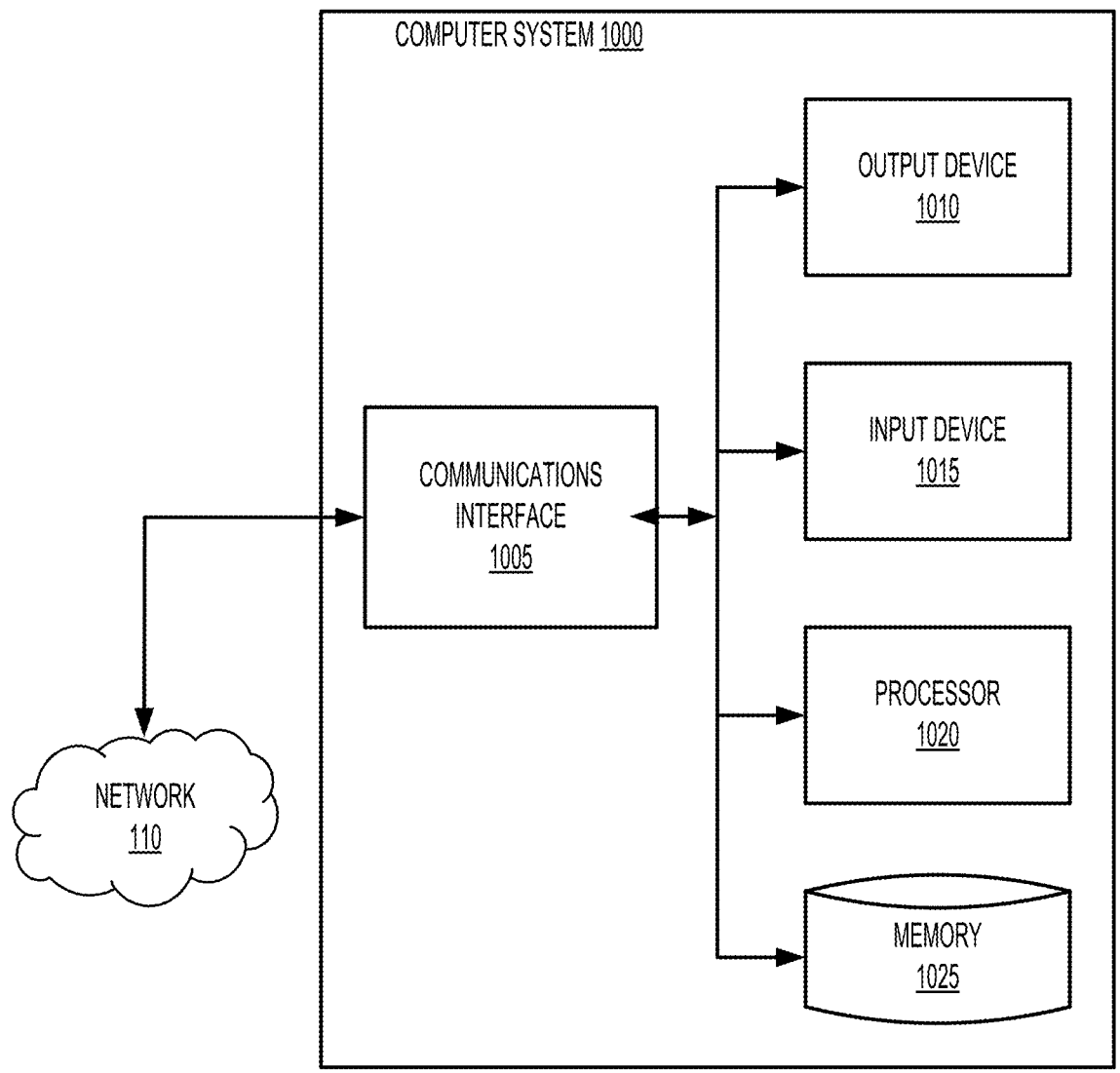
FIG. 10 illustrates the general architecture of an illustrative computer system that may be employed to implement any of the computers discussed herein.

Each of the components (e.g., the data processing system 105, the classifier maintainer 130, the feature space extractor 135, the content rule applier 140, the labelled data correlator 145, the discrimination model trainer 150, the content classifier 155, the data base 115, the classifiers 122A-N, the extracted features 124A-N, the content rules 126A-N, the labelled categories 128A-N, the network 110, the content provider 160, the client devices 120A-N, etc.) of the system 100 can be implemented using the hardware components or a combination of software with the hardware components of a computing system (e.g., computing system 1000 detailed herein in conjunction with FIG. 10, the data processing system 105, any other computing system described herein, etc.). Each of the components of the data processing system 105 can perform the functionalities detailed herein.

The data processing system 105 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein. The data processing system 105 can include any or all of the components and perform any or all of the functions of the computer system 1000 described herein in conjunction with FIG. 10.

The network 110 can include computer networks such as the Internet, local, wide, metro or other area networks, intranets, satellite networks, other computer networks such as voice or data mobile phone communication networks, and combinations thereof. The data processing system 105 of the system 1 can communicate via the network 110, for instance with at least one content provider 160. The network 110 may be any form of computer network that can relay information between the data processing system 105, the client devices 120, the content provider 160, the database 115, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. Any or all of the computing devices described herein (e.g., the data processing system 105, the computer system 1000, etc.) may communicate wirelessly (e.g., via WiFi, cellular, radio, etc.) with a transceiver that is hardwired (e.g., via a fiber optic cable, a CAT5 cable, etc.) to other computing devices in the network 110. Any or all of the computing devices described herein (e.g., the data processing system 105, the computer system 1000, etc.) may also communicate wirelessly with the computing devices of the network 110 via a proxy device (e.g., a router, network switch, or gateway).

The database 115 can be a database configured to store and/or maintain any of the information described herein. The database 115 can maintain one or more data structures, which may contain, index, or otherwise store each of the values, pluralities, sets, variables, vectors, or thresholds described herein. The database 115 can be accessed using one or more memory addresses, index values, or identifiers of any item, structure, or region maintained in the database 115. The database 115 can be accessed by the components of the data processing system 105, or any other computing device described herein, via the network 110. In some implementations, the database 115 can be internal to the data processing system 105. In some implementations, the database 115 can exist external to the data processing system 105, and may be accessed via the network 110. The database 115 can be distributed across many different computer systems or storage elements, and may be accessed via the network 110 or a suitable computer bus interface. The data processing system 105 can store, in one or more regions of the memory of the data processing system 105, or in the database 115, the results of any or all computations, determinations, selections, identifications, generations, constructions, or calculations in one or more data structures indexed or identified with appropriate values. Any or all values stored in the database 115 may be accessed by any computing device described herein, such as the data processing system 105, to perform any of the functionalities or functions described herein.

The client devices 120 can each include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The client devices 120 can each include one or more computing devices or servers that can perform various functions as described herein. The client devices 120 can each include any or all of the components and perform any or all of the functions of the computer system 1000 described herein in conjunction with FIG. 10.

Each of the client devices 120 can be computing devices configured to communicate via the network 110 to transmit or receive messages to or from the data processing system 105 or the content provider 160. The client devices 120 can be desktop computers, laptop computers, tablet computers, smartphones, personal digital assistants, mobile devices, consumer computing devices, servers, clients, digital video recorders, set-top boxes for televisions, video game consoles, or any other computing device configured to communicate via the network 110, among others. The client devices 120 can transmit one or more requests for content to a content publisher, a content provider, or data processing system 105. The client devices 120 can receive content from the device to which the request was transmitted, where the content is selected based on device information (e.g., device model, device type, device operating system, device operating system version, device time, device date, any other context information described herein, etc.) about the client device 120 responsible for the request, and based on context information included in the request indicating a content policy. The context information can include, for example, information about age restrictions for a particular website or application. The context information can include a subject matter of the content with which the requested content will be displayed (e.g., certain content may include sensitive information that may not be suitable for presentation with other content, etc.). Based on the content policy assigned to a content item, the device responsible for content selection (e.g., the data processing system 105, the content publisher 160, a content publisher, etc.) can block presentation or selection of content that is inappropriate for the context information.

The content provider 160 can include at least one processor and a memory, e.g., a processing circuit. The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The content provider 160 can include one or more computing devices or servers that can perform various functions as described herein. The content provider 160 can include any or all of the components and perform any or all of the functions of the computer system 1000 described herein in conjunction with FIG. 10.

The classifier maintainer 130 can maintain, in the database 115, a first feature classifier of the classifiers 122 that classifies or identifies features of content having a first media format, and a second feature classifier of the classifiers 122 that classifies features of content having a second media format. The classifier maintainer 130 may request certain feature classifiers from other network sources or organizational resources. Queries for such resources may be generated by the classifier maintain 130, and can subsequently be transmitted via the network 110 to an external computing device that may be responsible for training or maintaining the requested feature classifier. The classifier maintainer 130 may also generate and transmit other more general queries to search or request feature classifiers for a particular category or media format (e.g., requests for image classifiers, profanity classifiers, image classifiers, video classifiers, etc.). Media formats can include different types of media that may be displayed or provided by a content provider 160, or from other media sources accessible via the network 110. For example, a media format may be a type of video, a type of text, a type of audio, or a combination of those formats, such as a text post that includes a video clip, or other information. More complex media formats may include animated GIFs, videos encoded with subtitle information, and other media formats that may be packaged or presented together. The classifier maintainer 130 can receive or retrieve one or more classifiers from one or more sources via the network 110, or may generate one or more classifiers at the data processing system 105 using one or more of its components.

Once the classifier maintainer 130 has received or retrieved one or more of the feature classifiers from the network, or from the memory of the data processing system 105, the classifier maintainer can store the one or more feature classifiers as part of the classifiers 122. For example, the classifier maintainer 130 may assign an index value and package the one or more classifiers 122 along with a feature identifier that identifies the feature the classifier 122 (e.g., the feature classifier) can classify, along with a modality identifier that identifies the type or format of media the classifier 122 (e.g., the feature classifier) can classify. Packaging the classifier 122 can include generating one or more data structures in the database 115 to store, save, or otherwise maintain in computer memory the classifier 122.

The feature classifiers can be one or more of the classifiers 122, which may be stored by the classifier maintainer 130 in the database 115. classifiers 122 can include one or more models, such as logistic regression, linear regression, neural networks, or any other model type described herein that can identify, classify, or otherwise extract a certain feature from an item of media. In some implementations, each of the classifiers can be trained offline by a different processing system, or by the data processing system 105, which can subsequently store or maintain the classifier 122 in one or more data structures in the database 115. Some of the classifiers 122, for example, may be configured or trained to classify a certain type of feature, for example an object type, a category type, or other type of content in one or more media. In addition, some of the classifiers 122 can be configured or trained to classify features in of a particular data modality. For example, some of the classifiers 122 may be configured or trained to classify a certain feature of text data, some of the classifiers 122 may be configured or trained to classify a certain feature of image data, some of the classifiers 122 may be configured or trained to classify a certain feature of audio data, some of the classifiers 122 may be configured or trained to classify a certain feature of video data, and some of the classifiers 122 may be configured or trained to classify a certain feature of a data modality that is yet unknown.

Each of the classifiers 122 can be stored with a feature type identifier that identifies the type of feature that the respective classifier 122 can classify. Feature type identifiers can include text strings, index values, or other values that indicate that the respective classifier 122 can classify a certain feature. Each of the classifiers 122 can also be stored with a modality identifier that identifies the type of media content the classifier 122 can classify. Each of the classifiers 122 can be treated as a function or algorithm that can take a type of media content as an input. For example, if the classifier 122 is a convolutional deep neural network model to classify certain features of images, the classifier 122 can take an image, or an extracted frame of video, that is formatted to conform to the input of the classifier 122, as an input value (e.g., an input matrix, an input vector, a normalized matrix or vector, or another input data structure, etc.). One or more of the components of the data processing system 105 can process a media type to conform to the input of a classifier 122. The classifier 122 can include one or more layers, model types (e.g., neural network, logistic regression model, linear regression model, convolutional neural network, deep neural network, long short-term memory models, other types of machine learning or artificial intelligent models that can classify features of content, etc.). To classify audio data, the classifiers 122 may be implemented as a natural-language processing model that process one or more streams of audio to identify certain words or phrases of interest (e.g., profanity, or other classifiable words, phrases, sentences, or audio or speech information, etc.).

The classifier maintainer 130 can receive first labelled training data having the first media format and associated with a first feature, and store the labelled training data in the database 115 as part of the labelled categories 128. The training data can be configured to train one or more aggregate models, or be labelled to aid in machine learning algorithms to train models to identify a certain category for new or complex media formats. For example, the training data may be one or more media formats that fall into a certain category (e.g., a certain category of profanity, such as foul language, alcohol abuse, or any other type of category or format described herein), and may be assigned a label that indicates the category in which the media format falls. A certain training format may be a social media post that is known to contain foul language, or a movie or video clip that is known to show or indicate the consumption of alcohol, or a combination thereof. Such limited examples of media formats and categories are described merely for example purposes, and should not be construed as limiting the system to a particular classification type. Indeed, the classifier maintainer 130 can maintain classifiers 122 that can classify any known or unknown media format or feature, and can receive training data that may include combinations of media formats, or certain data modalities, that may be common, uncommon, or combinations of existing media formats. Features in media can include objects in images or videos that can be classified by the classifiers 122, words, phrases, or vocal patterns in audio streams or audio clips, words, phrases, or sentences in text data, or any combination thereof (e.g., subtitles or words in video or images, audio extracted from video clips, etc.).

The feature space extractor 135 can extract a feature space from a content item using the first feature classifier and the second feature classifier. The feature space extracted from a content item (e.g., any type of media in any format, etc.) can include assembling or aggregating a group of features that may be common to similar media types, or to media types that may be included in the content item (e.g., if the content item is a picture that includes text, a media type included in the content item would be text data, etc.). The feature space can be any aggregated set of features that can be identified, classified, or otherwise extracted by the classifiers 122, such as words or phrases in text, objects, people, expressions, facial characteristics, or other media information in video or images, and other vocal information (e.g., words, phrases, utterances, etc.) in audio information. Audio features may also include waveforms or other audio information that may correspond to an event or occurrence that produces audio. Extracting the feature space from the content item may further include extracting a first set of features from the content item using the first classification model (e.g., at least one of the classifiers 122). The feature space extractor 135 can combine two or more feature spaces from two or more content items to generate an aggregated feature space. An aggregated feature space can be used by the feature extractor 135 to generate a representation of a universe of features of a particular data modality.

The feature extractor 135 can apply one or more of the classifiers 122 (e.g., the classification model, etc.) to the content item to extract a set of features. The set of features can correspond to features classified in the content item that may contribute to a category (e.g., various objects that would indicate that an image is in a particular setting, such as a dog park, or includes profanity, such as foul language or themes, etc.). Extracting a feature space from the content item may further include extracting text information (e.g., text present in an image or video, etc.) from a content item using optical character recognition (OCR) techniques. Extracting a feature space from the content item may further include applying the text information as an input to the first feature classifier to extract the feature space. The text information may be formatted by the feature extractor 135 so that it can be used as an input to one of the classifiers 122. Formatting the text information can include extracting or filtering one or more terms of the text information to input into the respective classifier 122. The feature extractor 135 can store one or more of the extracted features in one or more data structures in the database 115 as the extracted features 124. The feature extractor 135 can associate the extracted features 124 extracted from a content item with an identifier of the content item. In some implementations, if a feature that could be present in a media format is not present in a content item, the extracted features 124 of that can include information that indicates that content item does not include that feature. As such, when extracting the feature space for a particular modality, the feature space extractor 135 can establish a universe of content features that may or may not be present in content items that share that modality or format. The feature extractor 135 can store or update the extracted features 124 for each content item to reflect whether that content item includes the features in the universe of features established for the modality or format of the content item.

The content rule applier 140 can apply a set of content rules 126 to the feature space to determine content metrics. The content rule applier 140 can retrieve one or more content rules 126 from the database 115, or from the memory of the data processing system 105. The content rules 126 can be, for example, one or more binary or rule-based functions that check for the presence of certain aspects or characteristics of a content item. For example, a content rule may be applied to text in a content item to determine whether an emoji (e.g. ":D", etc.) is present in the text. The content rules 126 may be logic based, arithmetic based (e.g., checking for a characteristics of an image after applying a certain image filter, etc.), or based on instructions executed by the content rule applier 140. By applying a content rule 126 to a content item, the content rule applier 140 can produce one or more content metrics. The content metrics can indicate a result of the content rule. In the previous example, where the content rules 126 could be used by the content rule applier 140 to check whether text included an emoji, the content metrics could include a binary value of '1' indicating that an emoji is present, or a binary value of '0' if an emoji is not present. The content rule applier 140 can identify various portions of content items on which to apply the one or more content rules 126 using various techniques, including optical character recognition.

The labelled data correlator 145 can correlate a set of known labelled data to the feature space, the content metrics, and aggregated content statistics to construct determinative training data. An advantage provided by the labelled data correlator 145 is that a data modality need not be associated with pre-labelled content. Instead, based on various characteristics of the feature space extracted by the feature space extractor 135, the content metrics determined by the content rule applier 140, and aggregated content statistics retrieved about the content items, the labelled data correlator can determine a label for the content item that indicates a content category or policy. The labelled data correlate can use construct determinative training data that includes the label and the content item to train a classification model for the desired modality. Accordingly, the labelled data correlator 145 can use information from various sources to associate a content item, for which a classifier may not exist, with one or more of the labelled categories 128. The labelled categories 128 may be retrieved from the database 115. The labelled categories 128 can be associated with one or more of the extracted features 124, the content rules 126 (e.g., satisfying one or more content rules may indicate an association with a particular labelled category, etc.), and other aggregated statistics. The aggregated statistics can include information about the content, or other content metadata. For example, the aggregated content statistics can include information about a user profile that was responsible for creating a social media post (where the social media post is the content item). In such an example, if the user profile responsible for the post has a history of posting profanity or inappropriate content, the content statistics may indicate that a particular content item falls into a category that indicates profanity or inappropriate content. The labelled data correlator 145 can aggregate any of the content metrics, the feature spaces, or the content statistics for one or more content items to correlate or estimate a proper label for one or more content items.

The discrimination model trainer 150 can train a discrimination model using the content item and the determinative training data. The discrimination model can be trained to classify or associate a content item with a content policy. The content item can have a data modality or format for which a classifier may not exist. Media formats or modalities can include video, text, audio, images, instructions for constructing interfaces that are subsequently displayed on a device, or any combination thereof. The discrimination model trainer 150 can construct an input vector using the determinative training data and the content item. For example, using the determinative training data, the discrimination model trainer can determine a type of model to train. Based on the type of model, the discrimination model trainer 150 can format, arrange, or otherwise construct the content item into an input data structure. The discriminative training data can include classification information about other data modalities that may be present in the content item. This classification information can be used, in addition to the content item, to construct a data structure (e.g., vector, matrix, tensor, etc.) to the discrimination model. Training the discrimination model may further include propagating the input vector through the discrimination model to generate a training output value. The training output value can be a result generated by the discrimination model by using the input data structure as an input. The resulting value can indicate a content policy or a content category. The discrimination model trainer 150 can update the discrimination model based on the difference between the training output value and an expected output value. The expected output value can be an identifier of one or more labelled categories 128 included in the determinative training data. The discrimination model trainer 150 can update one or more weight values, bias values, or coefficients of the discrimination model to cause the discrimination model to produce an output value that closer to an expected output value.

The discrimination model trainer 150 may also train one or more content feature classifiers. For example, the discrimination model trainer 150 can receive or retrieve training data for a type of content, and can train a content feature classifier to identify or extract the features of that content type. After training the content feature classifier using the training data, the discrimination model trainer 150 can store the content feature classifier as a classifier 122 in the data processing system 115. In some implementation, the discrimination model trainer 150 can store the discrimination model as one of the classifiers 122 in the database 115.

The content classifier 155 can classify a second content item using the discrimination model to assign a content policy to the second content item. The second content item can be transmitted, for example, by a content provider 160 to the data processing system for classification. In some implementations, a client device 120 can transmit a content item for classification using the discrimination model. The content classifier 155 can apply the content item to the discrimination model as an input. Applying the content item can include formatting or constructing the content item into an input data structure or vector such that it can be used as an input to the discrimination model. The content policy can be a content category that indicates whether the content item is appropriate for display in a given context. Once the content has been classified into the context, the content classifier can transmit the content policy associated with the content item to the device responsible for the classification request via the network 110.

Figure 2:
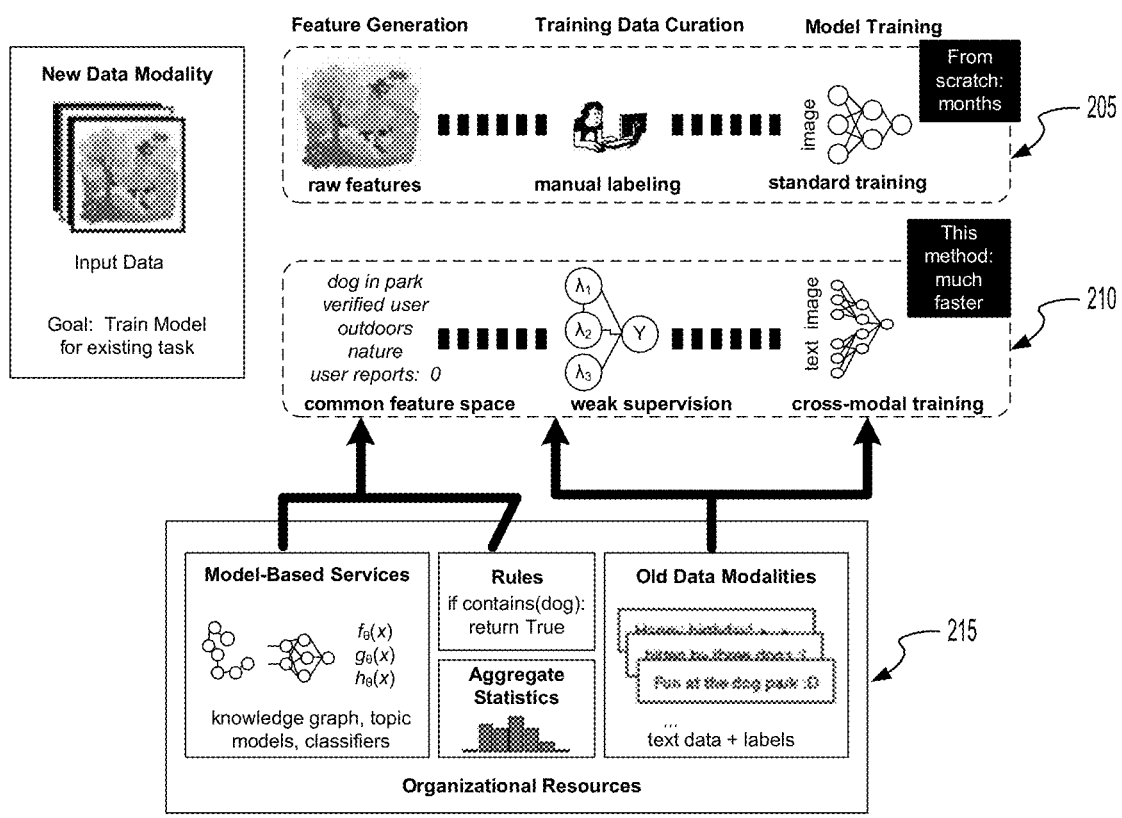
FIG. 2 illustrates a block diagram of contrasting data flows between other the implementations described in this technical solution.

Referring now to FIG. 2, illustrated is a block diagram of contrasting data flows between the implementations described in this technical solution. FIG. 2 contrasts the differences between a pipeline 205 that implements manual labelling of features in a new data modality and a pipeline 210 (e.g., processing carried out by the data processing system 105) that can perform automatic labelling of features in a new data modality. The pipeline 210 can take organizational resources 215 as inputs to perform automatic labelling and model training. The organizational resources can include the classifiers 122, the content rules 126, and aggregate statistics received from a content provider 160. The pipeline 210 can be implemented by the data processing system 105, as described herein above in conjunction with FIG. 1. The pipeline 205 that includes manual labelling of features of a new data modality can take weeks to produce a completed model, while the pipeline 210 implemented by the data processing system 105 can produce a content policy determination model for a new data modality in much less time.

Figure 3:
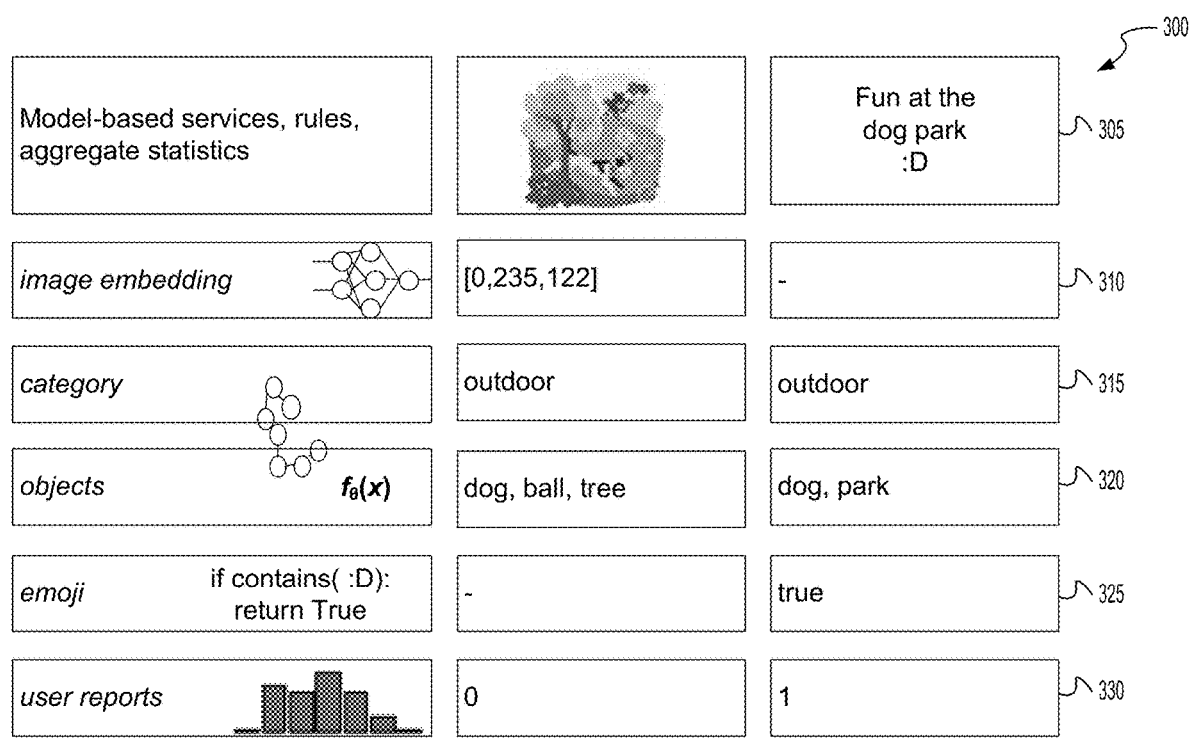
FIG. 3 illustrates a block representation of various model based services, rules, and aggregate statistics, and their application to an example item of content.

Referring now to FIG. 3 illustrated is a block representation of various model based services, rules, and aggregate statistics, and their application to an example item of content. For example, row 305 shows the components of a new data modality (e.g., a social media post), which can include an image and text presented with the image. Using organizational resources (e.g., the classifiers 122, the content rules 126, labelled categories 128, aggregated statistics, each described herein above in conjunction with FIG. 1, etc.) to create a common, structured feature space across data modalities for a post moderation task. Example image and text data (e.g., shown in row 305) may share three features: category (topic model, may point to classifier 122), objects present (classifier for related task), and the number of times the user posting the content has been reported (aggregate statistics).

Row 310 includes various image embedding information extracted by the data processing system 105. The category (e.g., row 315) can be determined based on features extracted by the data processing system 105, or by information or metadata included in the new data modality (social media post). Row 320 shows objects that have been extracted using the classifiers 122 by the data processing system 105. In this example, the objects "dog", "ball", and "tree" have been extracted from the image data, and the objects "dog" and "park" have been extracted from the text dat. Row 325 shows the application of a content rule that checks for the presence of an emoji. Because no emoji is included in the image data, this shows as a null placeholder value, or but because an emoji is present in the text data, it produces a content metric of "True". Aggregate statistics are shown in row 330, which in this example describe how many times the profile responsible for the social media post has been reported. According to the data in row 325, the user has been reported zero times for posted images, but has been reported one time for posted text.

Figure 4:
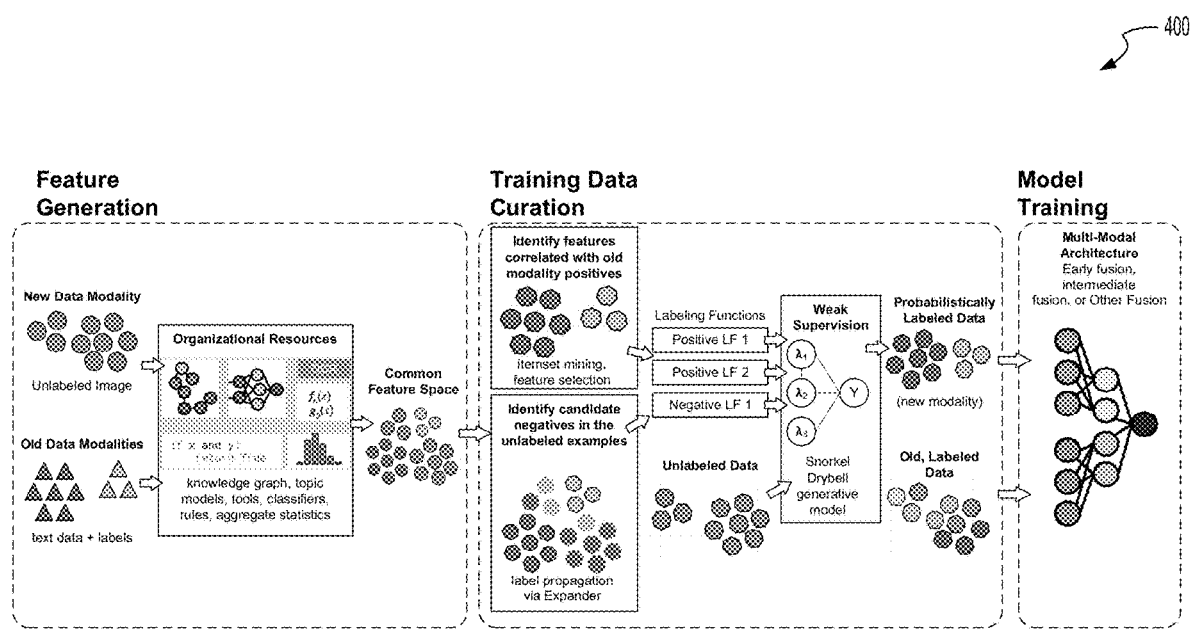
FIG. 4 illustrates a block representation of an example flow of modality information as it passes through the system.

Referring now to FIG. 4, illustrated is a block representation of an example data flow 400 of modality information as it passes through the system (e.g., the pipeline 210 implemented by the data processing system 105). As shown in the diagram, depicted are at least three stages in the pipeline 210, including the steps of feature generation, training data curation, and model training. The feature generation operations illustrated can be carried out, for example, by the feature space extractor 135 of the data processing system 105. The training data curation operations can be carried out, for example, by the labelled data correlator 145 and the content rule applier of the data processing system 105. The model training operations can be carried out, for example, by the discrimination model trainer 150 of the data processing system 105.

In the feature generation steps, data of both new (e.g., unlabeled) and old (e.g., labelled) modalities can be first transformed into a common feature space by the data processing system 105. In the training data curation steps, the data processing system can utilize the feature space to implement weak supervision to curate labelled training data in the new modality. The data processing system 105 can utilize the curated labelled training data to train a model for the new modality.

Figures 5A, 5B, 5C:
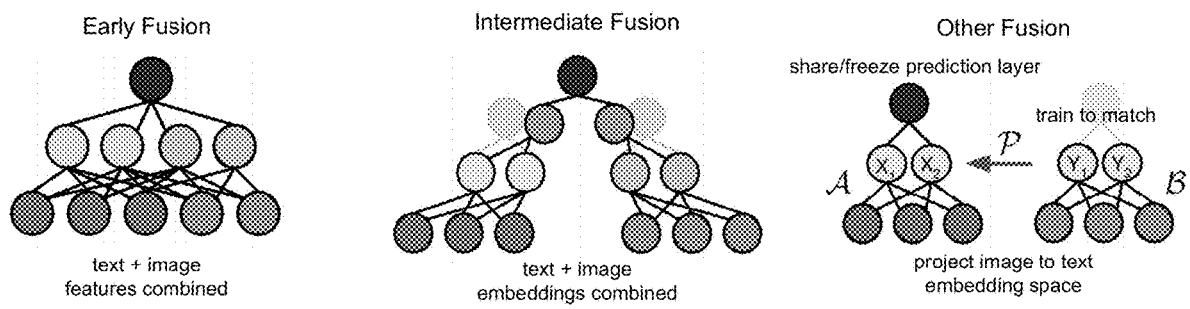
FIGS. 5A, 5B, and 5C illustrate block representations of various model types that can be used to implement cross-modal media classification.

FIGS. 5A, 5B, and 5C illustrate block representations of various model types that can be used to implement cross-modal media classification. Depicted in FIG. 5A is a model implemented using early fusion techniques. In early fusion techniques, the features of all data modalities can be merged to create a single common representation. Features shared by all data modalities can be merged into a single field (e.g., raw text from text posts, and captions derived from image data points), and features specific to certain data modalities are left empty for those that do not have these features present (e.g., image-specific embeddings may not be present in text data). Data modalities and label sources can then be jointly trained.

Depicted in FIG. 5B is a model implemented using an intermediate fusion technique. In Intermediate Fusion, an embedding for each data modality can be learned, and these embeddings can be concatenated as input to a final, jointly trained model. Training can proceed in two passes over the training data. In the first stage, independent models can be created for each data modality. In the second stage, the final prediction layer (e.g., softmax) can be removed from each of these models. A second pass over all of the data can then be performed, where the shared features are passed into all models in which they exist. The model outputs can be concatenated to create a new feature embedding. This embedding can be used as input to a final model for training. Construction of this architecture is motivated by the fact that data modalities with fewer data points may get overpowered in the early fusion model. By training each modality independently prior to concatenation, this can be alleviated.

Depicted in FIG. 5A is a model implemented using other fusion techniques. In other fusion techniques, an embedding using existing data modalities can be learned, and then project data points from the new modality to the embedding space for classification. First, a model A can be trained over existing data modalities as in early fusion. This model is then "frozen," so none of its parameters change. Next, a model B can be trained over the weakly supervised data of the new modality. In the final training stage, we pass points of the new modality to B and simultaneously pass the shared features between the existing and new modalities as input to A, and compute the model outputs prior to the final prediction (e.g., softmax) layer of both A and B, which we denote X and Y, respectively. We then train a "projection layer" P to match Y with X. At inference time, we pass incoming data points through B and the projection layer P, and use the final prediction layer of the initially trained, frozen A.

Included below are results from an example implementation of the techniques described herein that is used to illustrate some of the technical improvements provided by certain implementations of the systems described above. Although experimental data is included below, it should be understood that this data is presented purely for example purposes and should not be construed as limiting the overall performance increases provided by the system across all implementations.

Described below is an example case study in developing a pipeline for cross-modal adaptation. First, 5 classification tasks, organizational resources, and experimental setup are described. Then, it is demonstrate that:

1. End-to-End: The cross-modal pipeline described herein outperforms a fully supervised pipeline that uses up to 750 k data points with respect to area-under the precision recall curve (AUPRC), reflecting days to weeks of manual labeling time.

2. Organizational Resources: Model performance with respect to AUPRC may scale with the amount of organizational resources used, with features playing a larger role than data modalities.

TABLE 1

We report the characteristics of the service sets used to generate our common features, in accordance with this example implementation and case study.

| Service Set | Number of Services | Service Type |
| --- | --- | --- |
| A | 3 | URL-Based |
| B | 2 | Keyword-Based |
| C | 5 | Topic-Model-Based |
| D | 5 | Page-Content-Based |

3. Modalities: Training a model using manually labeled data of existing data modalities is up to 1.63× less effective than using weakly supervised data of the target modality with respect to AUPRC.

4. Modalities: Jointly training data modalities is up to 1.63× and 1.23× better than training on text or image in isolation, respectively, in terms of AUPRC, and the fusion architecture consistently returns the best model performance.

5. WS: Automatic LF creation can be up to 1.87× faster than manual development by an expert, which required 7 hours spread over 2 weeks, and performs 3% and 14.3% better with respect to dataset coverage and precision, respectively.

6. WS: Label propagation can enable better training data curation by complementing high precision labeling functions to improve recall by up to 162×, translating to up to 1.25× improvement in F1 score.

Classification Tasks

Five classification tasks that fall broadly under the categories of topic or object classification are evaluated.

A two-data-modality setting is considered, where tasks are initially trained for text entities and must now apply to image entities. By definition, labeled data in the new modality may not exist in a cross-modal adaptation setting, and there are large volumes of unlabeled live data. Thus, to evaluate the performance of the cross-modal pipeline, a modality that we have curated manually-labeled data for (e.g., image) is treated as the "new" modality, and use the manually-labeled data points as a test set that is not used at any intermediate step. Live traffic can be sampled to generate unlabeled data independent of previously labeled image data.

Figure 7:
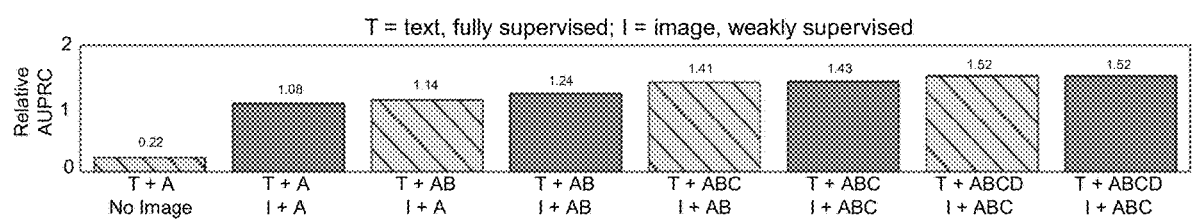
FIG. 7 illustrates a graph comparing data from various training implementations of models used to classify content items containing one or more modalities.
Figure 8:
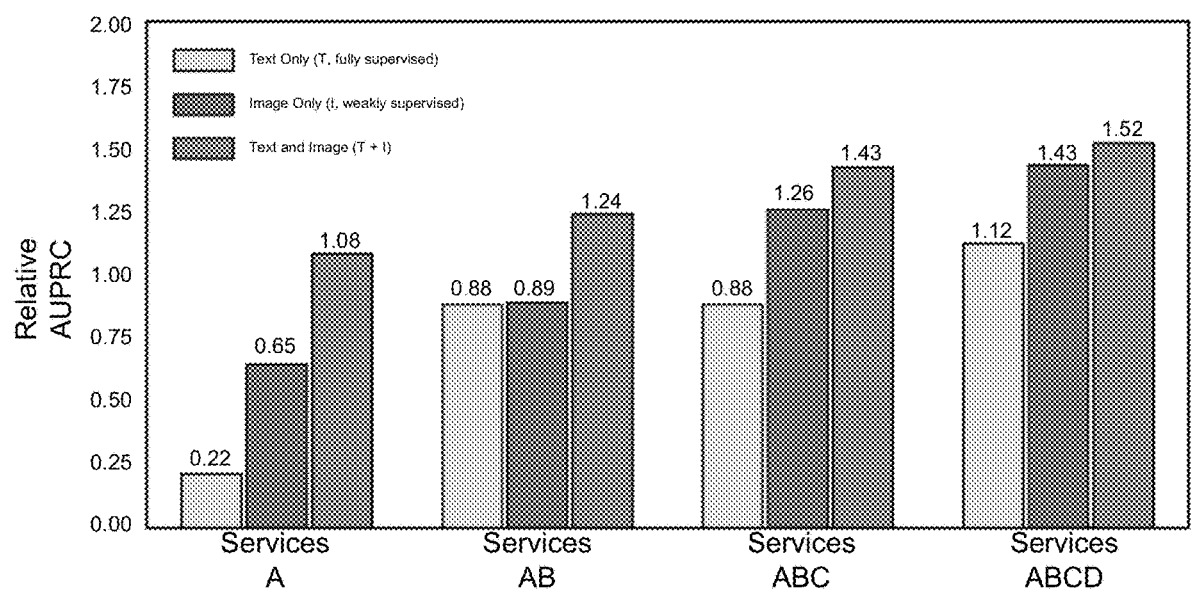
FIG. 8 illustrates a graph comparing the performance of the system using various configurations when classifying different types of content.

In the evaluation, T can refer to a fully supervised text model, and I refers to a weakly supervised image model. The graphs in FIGS. 6-8 reflect the results from CT 1.

Organizational resources across two of the categories described herein are leveraged:

Model-Based Services. Custom topic models, knowledge graphs, named entity recognition (NER) models, and object detection models that are globally maintained are used. These services can generate information such as topic hierarchies and categorizations, keywords given categories of interest, and language translations. While many of these models operate over both text and image, the system can transform image data points to the text space so the remainder can be used. The system can utilize optical character recognition (OCR) and image captioning to convert images to formats that text-based services can use.

Aggregate Statistics and Metadata. Metadata including device ID, URL, keywords, and categorization, among others, can be extracted from a data point. Classification models can be deployed while collecting this metadata. As a result, aggregate statistics can be computed from the outputs of these models across devices, URLs, topics and categories, among others.

Sixteen shared services are used for this example implementation: fourteen are categorical and multivalent, and two are non-servable (including the output of label propagation). In addition, images possess three pre-trained embedding and image-specific services. The shared services are separated into four sets based on the service they are derived from, and data modality to which they apply (e.g., keyword-based, topic-model-based, URL-based, etc.). They are labeled as sets A, B, C, and D, which provide 3, 2, 5, and 5 features, respectively (see Table 6). Which features are included in the discriminative model for each modality is stated as T+[ABCD]* and I+[ABCD]*.

Example Implementation. This example implementation includes the feature engineering and LF pipeline. In the case of multi-modal training, this refers to the models for each modality prior to embedding concatenation. In this example implementation, the models in the pipelines are implemented logistic regression and fully-connected deep neural networks. Performance is reported over the neural network models for CT 1-4, and logistic regression for CT 5 due to improved performance.

Evaluation Metric. We compute the area under the precision-recall curve (AUPRC) over the labeled image test set to evaluate our pipeline. Rather than metrics such as accuracy or F1 score, AUPRC may provide a more meaningful evaluation criterion in class-imbalanced cases. Further, depending on the sensitivity of the task to the organization, the cut-off to compute metrics such as F1 score may be decided upon the production performance, which may render AUPRC more representative for offline evaluation. AUPRC relative to a baseline fully supervised image model trained with only pre-trained embedding features is reported.

End-to-End Comparison

Figure 6:
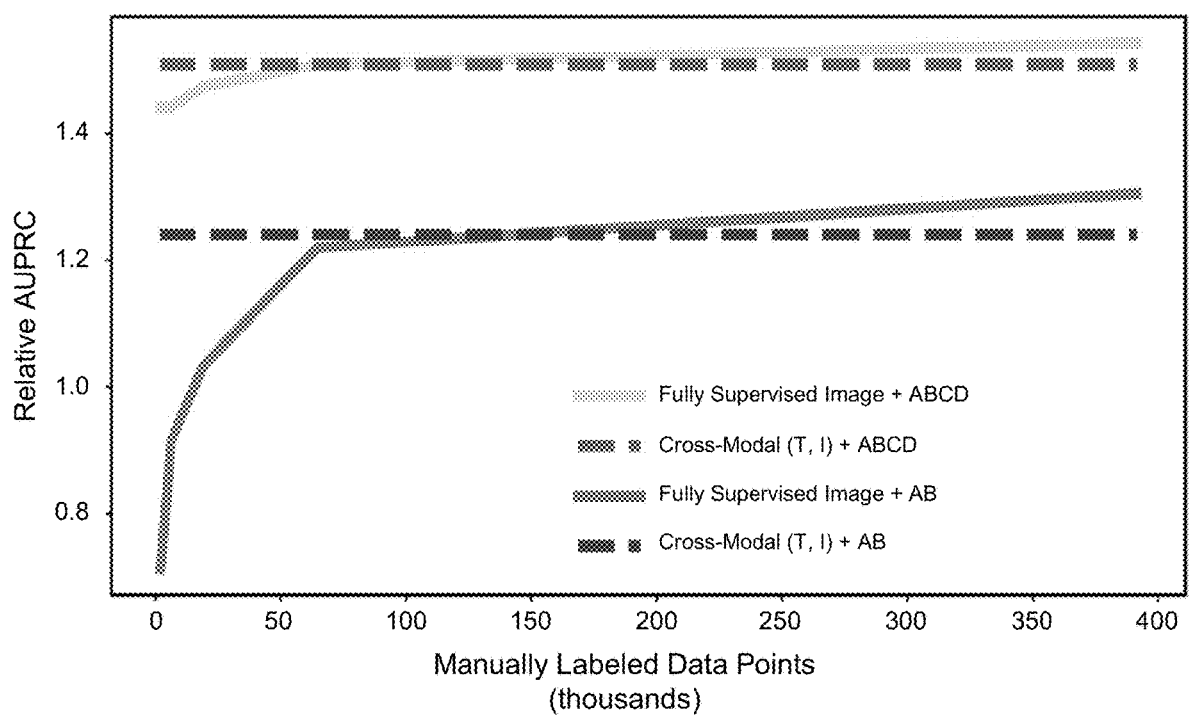
FIG. 6 illustrates a graph depicting data from an example implementation of one or more systems described herein compared with manual labelling of content items.

Referring now to FIG. 6, the performance of the pipeline for cross-modal adaptation is compared with a manually-labeled, fully supervised image model using features from all services (A, B, C, D) and with two sets of services (A, B) for CT 1. All services are used to generate LFs and perform weak supervision in both cases. Two takeaways may be demonstrated by this experiment. First, the cross-over point at which a fully supervised model with all available features will outperform our cross-modal pipeline is at approximately 60 k data points. This can represent weeks to months of manual-curation time, depending on how many resources are expended for the task. In contrast, using example implementations of techniques described herein for cross-modal adaptation can enable the development of pipelines for each task in under a week in parallel. Next, it is observed that when fewer features are used for the discriminative end-model compared to WS (mimicking the existence of non-servable features), the benefits of our cross-modal pipeline are greater—the cross-over point is instead roughly 140K data points for this task. For the remainder of the tasks, it is displayed that the cross-over point at which a fully supervised model outperforms our cross-modal pipeline. Regardless of the exact cross-over point, it is noted that in each case, the techniques for a cross-modal pipeline described herein enable deployment of models without waiting for domain experts to be trained for the task. In addition, in the case of business-critical tasks that require manual approval, cross-modal models can be used for active learning to assist with sampling points for collecting manually-labeled ground-truth.

Referring now to FIG. 6, we perform a factor analysis to demonstrate that adding additional features and data modalities (e.g., organizational resources such as the classifiers 122, the extracted features 124, the content rules 126, or the labeled categories 128, etc.) incrementally improves end-model performance in CT 1. At each step of the factor analysis, a new feature is added to either the text modality or the image modality. The data is jointly trained from both modalities using a fusion model as described herein above. It is observed that the addition of new features may improve performance more significantly than the inclusion of more data modalities containing these features (in FIG. 7, these are steps from solid to hatched bars). However, it is noted that this behavior may be dependent on the task and the relative distribution differences across features in different modalities. For instance, this may have been true for the tasks described herein simply because under the common feature space, both text and image data points possessed similar feature distributions. Leveraging features with different distributions across modalities may alter these results. However, these results are purely for example purposes, and should not be construed as a limitation to the overall potential performance of the system.

TABLE 2

AUPRC for a fully-supervised text model (T + ABCD), a weakly-supervised image model (I + ABCD) and a cross-modal model (T, I + ABCD) using all four sets of services, relative to a fully supervised image model trained with only pre-trained image embedding features. Reporting the number of fully-supervised image examples required to out-perform approaches described herein (e.g. "cross-over" point). Note that this information is provided purely for example purposes, and should not be construed as limiting the potential improvements provided by the implementations provided herein.

| Task | Text | Image | Cross-Modal | Cross-Over |
|------|------|-------|-------------|------------|
| CT 1 | 1.12 | 1.43  | 1.52        | 60k examples |
| CT 2 | 1.49 | 2.32  | 2.43        | 50k examples |
| CT 3 | 0.88 | 0.95  | 1.14        | 5k examples |
| CT 4 | 1.74 | 2     | 2.45        | 4k examples |
| CT 5 | 1.67 | 2.03  | 2.42        | 750K examples |

Referring now to FIG. 6, the factor analysis described herein above is augmented by performing a lesion study over data modality for CT 1 as the feature set is augmented. Two findings are emphasized.

First, it is demonstrated that training a fully supervised model over existing data modalities (e.g., text) and using it for inference on a new target modality (e.g., image) is not as effective as a weakly supervised model trained in the target modality. A model trained on a weakly supervised image dataset of only 7.2M examples outperforms one trained on a fully supervised text dataset containing 18.4M examples, despite being 39% the size and lacking manually-curated labels. This effect may be amplified when using fully supervised data of the target modality (in CT 1, the text model performed 1.4× worse despite having 48× more data). This occurs as despite the common feature space, the input distribution is different across modalities.

Second, it is demonstrated that combining data modalities via multi-modal training improves performance when compared to training any one modality in isolation. Similar to the factor analysis, this holds true as the feature set is incrementally augmented.

In this example implementation and experiment, data is jointly trained from both modalities using a fusion model. It was found that for the tasks, the fusion model outperformed some alternatives, despite being the simplest of the approaches. Compared to intermediate fusion, fusion may perform up to 1.22× (average 1.08×) better across certain tasks. Compared to other fusion techniques, early fusion performs up to 5.52× (average 2.21×) better.

Evaluation of the performance of our training data curation phase in isolation is performed herein. As the quality of the curated labels is the focus, certain canonical metrics for evaluating the performance of WS following the output of the generative model are observed: precision, recall and F1 score. First, a comparison between automatically generated labeling functions and manually-generated ones. Then, the effect of using label propagation as an LF is explored.

Automatic vs. Manual LF Generation

To evaluate the performance of automatically generated LFs via frequent item set mining, a ground truth was collected by manually generated candidate LFs for CT 1. As previously noted, a key limitation in using domain experts to generate LFs is experts for each language and region are required to construct high-quality LFs, just as needed for labeling individual data points. As a result, for this task alone, we restrict our data points to English for a more representative comparison.

A comparison of manually- and automatically-generated LFs in terms of time to construct and the performance of an example implementation of the generative model described herein was performed. While the automatically generated LFs were computed in 3.75 hours (14 minutes for item set mining and 3.75 hours for label propagation in parallel), the human generated LFs required 7 hours spread over days to weeks. The LFs generated by the example implementation of the system described herein outperformed the manually-generated ones by 2.7 F1 points, which reflect a 14.3% increase in precision and 9.6% decrease in recall, with a 3% increase in coverage and 1.35× improvement in AUPRC. While each of these tasks can be parallelized based on resources, these gains are purely example data, and should not be construed as a limitation on the overall potential improvement the system can provide.

Label Propagation

The precision, recall and F1 score of the example implementation's generative model is compared, and the end AUPRC of the discriminative model when using LFs developed with and without label propagation. All values show the relative improvement that label propagation provides in comparison with LFs purely generated with item set mining. As stated herein above, label propagation may provide high recall LFs to offset the generated high precision LFs, resulting in net F1 improvement—up to over an order of magnitude.

In tasks such as CT 2, the automatically mined LFs are sufficient in capturing both high precision and recall, indicating the positive class is "easier" to identify. Such cases can be identified a priori by evaluating results of WS using only the mined LFs with a text development set, saving 3.5 to 5 hours of processing time. Simultaneously, there are tasks such as CT 1 or CT 5 where improvements in F1 score may not translate to AUPRC improvement in the end model. However, rather than being a limitation of the method, this is a limitation of the held-out, manually-curated test set. In small-scale experiments, it has been verified that label propagation's improved recall signifies that it is better identifying borderline positive and negatives, and thus may be uncovering examples that were either not sampled for review (e.g., in the rare events case) or incorrectly labeled by manual reviewers. Thus, the use of graph-based methods to both de-noise and identify new labeled examples based on existing data modalities are explored.

TABLE 3

Relative improvement gained in the training data curation step from using label propagation, compared to LFs that do not. Label propagation may improve recall, resulting in a net increase in F1 score. Note that this information is provided purely for example purposes, and should not be construed as limiting the potential improvements provided by the implementations provided herein.

| Task | Precision | Recall | F1    | AUPRC |
|------|-----------|--------|-------|-------|
| CT 1 | 0.95×     | 1.23×  | 1.10× | 1.01× |
| CT 2 | 1×        | 1×     | 1×    | 1×    |
| CT 3 | 0.87×     | 1.31×  | 1.21× | 1.25× |
| CT 4 | 1.45×     | 162×   | 129×  | 1.24× |
| CT 5 | 1.4×      | 46×    | 44×   | 1.05× |

Figure 9:
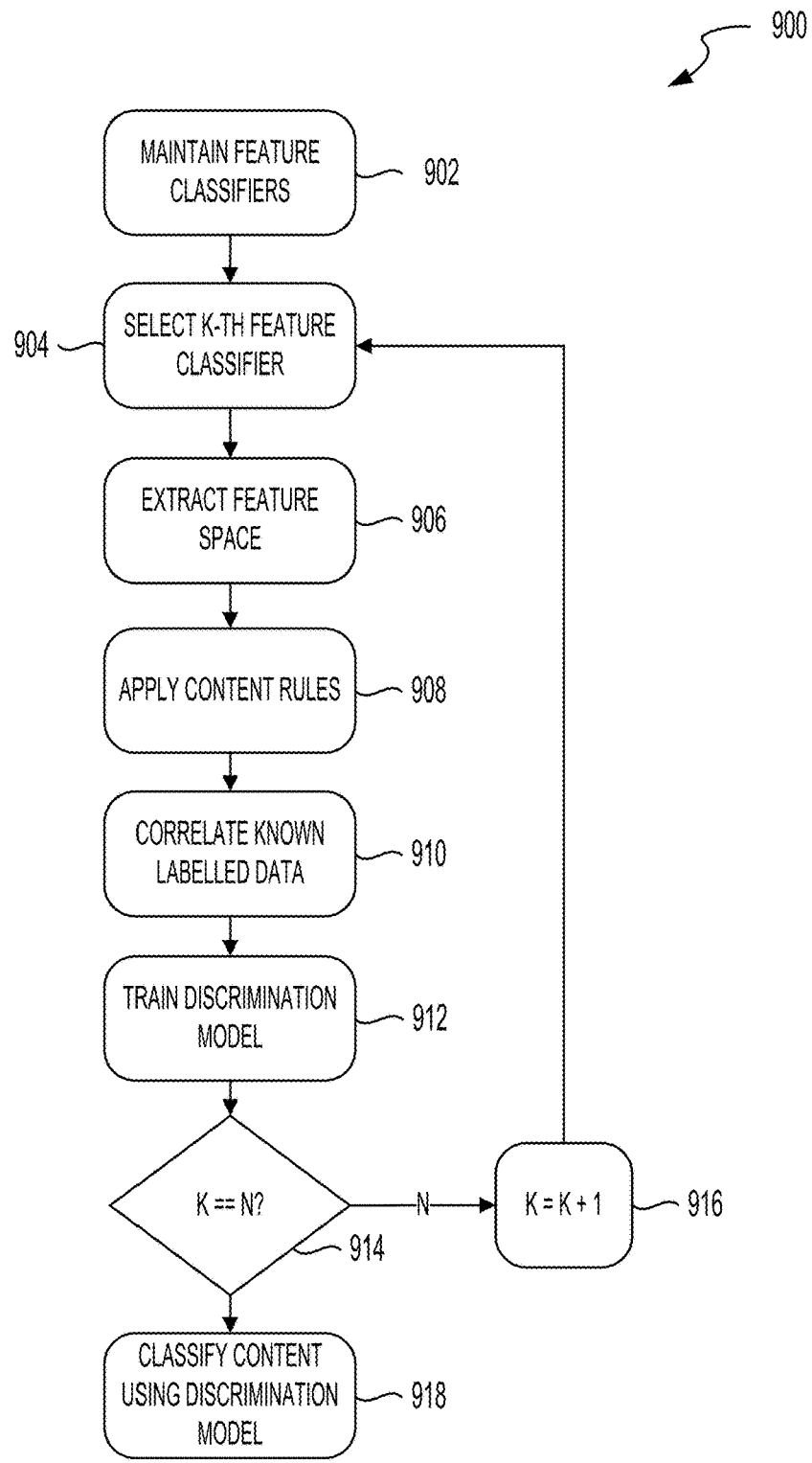
FIG. 9 illustrates an example flow diagram of a method for classifying content across media formats based on weak supervision and cross-modal training.

Referring now to FIG. 9, depicted is an illustrative flow diagram of a method 900 for classifying content across media formats based on weak supervision and cross-modal training. The method 900 can be executed, performed, or otherwise carried out by the data processing system 105, the computer system 1000 described herein in conjunction with FIG. 10, or any other computing device described herein. A data processing system (e.g., the data processing system 105 can maintain one or more feature classifiers (ACT 902). The data processing system can select the k-th feature classifier (ACT 904). The data processing system can extract a feature space using the selected feature classifier (ACT 906). The data processing system can apply one or more content rules (ACT 908). The data processing system can correlate known labelled data (ACT 910). The data processing system can train or update the discrimination model (ACT 912). The data processing system can determine whether the counter register k is equal to the number of feature classifiers n (DECISION 914). The data processing system can increment the counter register k (ACT 918). The data processing system can classify content using the trained discrimination model (ACT 920).

The data processing system (e.g., the data processing system 105 can maintain one or more feature classifiers (ACT 902). Maintaining one or more feature classifiers (e.g., the classifiers 122) can include storing at least one classifier in a database (e.g., the database 115) in one or more data structures. Each of the classifiers maintained by the data processing system can be indexed by a feature identifier, such that the appropriate classifier for a particular feature may be identified using an identifier of a feature of interest. The data processing system can maintain one or more feature classifiers. The feature classifiers can include one or more neural networks, machine learning models, or rule-based classifiers, or other algorithms or data usable to identify a feature of content. The feature classifiers can be maintained or stored in association with information or instructions that indicate the inputs and outputs of the feature classifier. The usage information can be used by the data processing system to generate, modify, or format content such that it may be used in conjunction with a particular feature classifier. Each of the feature classifiers stored in the one or more data structures in the database 115 may also be stored in one or more data structures in the memory of the data processing system. The one or more feature classifiers can include models that are pre-trained or preconfigured to identify features that are present in content. The one or more feature classifiers may be specialized for a particular content format (e.g., text, image, video, audio, etc.).

The data processing system can select the k-th feature classifier (ACT 904). To extract each of the features present in a content item to train the discrimination model, the data processing system can iteratively loop through each of the received requests based on a counter register k. Each of the feature classifiers can be stored and indexed in a data structure by an index value (e.g., index 0, index 1, index 2, etc.). To analyze content with a feature classifier, the data processing system can select the classifier that is stored in association with an index value equal to the counter register k. If it is the first iteration of the loop, the counter register k may be initialized to an initialization value (e.g. k=0) before selecting the k-th classifier. Accessing the classifiers can include copying the data associated with the selected classifier to a different region of computer memory, for example a working region of memory in the data processing system.

The data processing system can extract a feature space using the selected feature classifier (ACT 906). The feature space extracted from a content item (e.g., any type of media in any format, etc.) can include assembling or aggregating a group of features that may be common to similar media types, or to media types that may be included in the content item (e.g., if the content item is a picture that includes text, a media type included in the content item would be text data, etc.). The feature space can be any aggregated set of features that can be identified, classified, or otherwise extracted by a classifier (e.g., the classifiers 122), such as words or phrases in text, objects, images of people, indications of facial expressions, facial characteristics, or other media information in video or images, and other vocal information (e.g., words, phrases, utterances, etc.) in audio information. Audio features may also include waveforms or other audio information that may correspond to an event or occurrence that produces audio. Extracting the feature space from the content item may further include extracting a first set of features from the content item using a first classification model (e.g., at least one of the classifiers 122). The data processing system can combine two or more feature spaces from two or more content items to generate an aggregated feature space. An aggregated feature space can be used by the data processing system to generate a representation of a universe of features of a particular data modality.

The data processing system can apply one or more of the classifiers 122 (e.g., the classification model, etc.) to the content item to extract a set of features. The set of features can correspond to features classified in the content item that may contribute to a category (e.g., various objects that would indicate that an image is in a particular setting, such as a dog park, or includes profanity, such as foul language or themes, etc.). Extracting a feature space from the content item may further include extracting text information (e.g., text present in an image or video, etc.) from a content item using optical character recognition (OCR) techniques. Extracting a feature space from the content item may further include applying the text information as an input to the first feature classifier to extract the feature space. The text information may be formatted by data processing system so that it can be used as an input to one of the feature classifiers (e.g., the classifiers 122). Formatting the text information can include extracting or filtering one or more terms of the text information to input into the respective feature classifier. The data processing system can store one or more of the extracted features in one or more data structures in a database (e.g., the database 115) as a set of extracted features (e.g., the extracted features 124). The data processing system can associate the features extracted from the content item with an identifier of the content item. In some implementations, if a feature that could be present in a media format is not present in a content item, the extracted features can include information that indicates that content item does not include that feature. As such, when extracting the feature space for a particular modality, the data processing system can establish a universe of content features that may or may not be present in content items that share that modality or format. The data processing system can store or update the extracted features for each content item to reflect whether that content item includes the features in the universe of features established for the modality or format of the content item.

The data processing system can apply one or more content rules (ACT 908). The data processing system can apply a set of content rules to the feature space to determine content metrics. The data processing system can retrieve one or more content rules (e.g., the content rules 126) from a database, or from the memory of the data processing system. The content rules can include, for example, one or more binary or rule-based functions that check for the presence of certain aspects or characteristics of a content item. For example, a content rule may be applied to text in a content item to determine whether an emoji (e.g. ":D", etc.) is present in the text. The content rules may be logic based, arithmetic based (e.g., checking for a characteristics of an image after applying a certain image filter, etc.), or based on instructions executed by the data processing system. By applying a content rule to a content item, the data processing system can produce one or more content metrics. The content metrics can indicate a result of the content rule. In the previous example, where the content rules could be used by the data processing system to check whether text included an emoji, the content metrics could include a binary value of '1' indicating that an emoji is present, or a binary value of '0' if an emoji is not present. The data processing system can identify various portions of content items on which to apply the one or more content rules 126 using various techniques, including optical character recognition.

The data processing system can correlate known labelled data (ACT 910). The data processing system can correlate a set of known labelled data to the feature space, the content metrics, and aggregated content statistics to construct determinative training data. An advantage provided by the data processing system is that a data modality need not be associated with pre-labelled content. Instead, based on various characteristics of the feature space extracted by the data processing system, the content metrics determined by the data processing system, and aggregated content statistics retrieved about the content items, the labelled data correlator can determine a label for the content item that indicates a content category or policy. The labelled data correlate can use construct determinative training data that includes the label and the content item to train a classification model for the desired modality. Accordingly, the data processing system can use information from various sources to associate a content item, for which a classifier may not exist, with one or more labelled categories (e.g., the labelled categories 128). The labelled categories may be retrieved from a database or the memory of the data processing system 105. The labelled categories can be associated with one or more of the extracted features, the content rules (e.g., satisfying one or more content rules may indicate an association with a particular labelled category, etc.), and other aggregated statistics. The aggregated statistics can include information about the content, or other content metadata. For example, the aggregated content statistics can include information about a user profile that was responsible for creating a social media post (where the social media post is the content item). In such an example, if the user profile responsible for the post has a history of posting profanity or inappropriate content, the content statistics may indicate that a particular content item falls into a category that indicates profanity or inappropriate content. The data processing system can aggregate any of the content metrics, the feature spaces, or the content statistics for one or more content items to correlate or estimate a proper label for one or more content items.

The data processing system can train or update the discrimination model (ACT 912). The data processing system can train a discrimination model using the content item and the determinative training data. The discrimination model can be trained to classify or associate a content item with a content policy. The content item can have a data modality or format for which a classifier may not exist. Media formats or modalities can include video, text, audio, images, instructions for constructing interfaces that are subsequently displayed on a device, or any combination thereof. The data processing system can construct an input vector using the determinative training data and the content item. For example, using the determinative training data, the discrimination model trainer can determine a type of model to train. Based on the type of model, the data processing system can format, arrange, or otherwise construct the content item into an input data structure. The discriminative training data can include classification information about other data modalities that may be present in the content item. This classification information can be used, in addition to the content item, to construct a data structure (e.g., vector, matrix, tensor, etc.) to the discrimination model. Training the discrimination model may further include propagating the input vector through the discrimination model to generate a training output value. The training output value can be a result generated by the discrimination model by using the input data structure as an input. The resulting value can indicate a content policy or a content category. The data processing system can update the discrimination model based on the difference between the training output value and an expected output value. The expected output value can be an identifier of one or more labelled categories included in the determinative training data. The data processing system can update one or more weight values, bias values, or coefficients of the discrimination model to cause the discrimination model to produce an output value that closer to an expected output value.

The data processing system can determine whether the counter register k is equal to the number of feature classifiers n (DECISION 914). To determine whether the data processing system has updated the feature space using each of the feature classifiers, the data processing system can compare the counter register used to select each classifier to the total number of classifiers n. If the counter register k is not equal to (e.g., less than) the total number of classifiers n, the data processing system can execute (ACT 916). If the counter register k is equal to (e.g., equal to or greater than) the total number of classifiers n, the data processing system can execute (ACT 918).

The data processing system can increment the counter register k (ACT 916). To use each of the classifiers stored in the database to update the feature space of a content item, the data processing system can add one to the counter register k to indicate the number of classifiers that have been used. In some implementations, the data processing system can set the counter register k to a memory address value (e.g., location in computer memory) of the next location in memory of the next unused classifier, for example in a data structure. If this is the first iteration of this loop, the data processing system can initialize the counter register k to an initial value, for example zero, before incrementing the counter register. After incrementing the value of the counter register k, the data processing system can execute (ACT 904) of the method 900.

The data processing system can classify content using the trained discrimination model (ACT 918). The data processing system can classify a second content item using the discrimination model to assign a content policy to the second content item. The second content item can be transmitted, for example, by a content provider (e.g. the content provider 160) to the data processing system for classification. In some implementations, a client device (e.g. the client device 120) can transmit a content item for classification using the discrimination model. The data processing system can apply the content item to the discrimination model as an input. Applying the content item can include formatting or constructing the content item into an input data structure or vector such that it can be used as an input to the discrimination model. The content policy can be a content category that indicates whether the content item is appropriate for display in a given context. Once the content has been classified into the context, the content classifier can transmit the content policy associated with the content item to the device responsible for the classification request via the network 110.

FIG. 10 shows the general architecture of an illustrative computer system 1000 that may be employed to implement any of the computer systems discussed herein in accordance with some implementations. The computer system 1000 can be used to provide information via the network 110 for display. The computer system 1000 of FIG. 10 comprises one or more processors 1020 communicatively coupled to memory 1025, one or more communications interfaces 1005, and one or more output devices 1010 (e.g., one or more display units) and one or more input devices 1015. The processors 1020 can be included in any of the computing device described herein.

In the computer system 1000 of FIG. 10, the memory 1025 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 1000 of FIG. 10, the computer system 1000 can include the memory 1025 to store information any of the information, variables, vectors, data structures, or other computer-readable information described herein, among others. The processor(s) 1020 shown in FIG. 10 may be used to execute instructions stored in the memory 1025 and, in so doing, also may read from or write to the memory various information processed and or generated pursuant to execution of the instructions.

The processor 1020 of the computer system 1000 shown in FIG. 10 also may be communicatively coupled to or control the communications interface(s) 1005 to transmit or receive various information pursuant to execution of instructions. For example, the communications interface(s) 1005 may be coupled to a wired or wireless network, bus, or other communication means and may therefore allow the computer system 1000 to transmit information to or receive information from other devices (e.g., other computer systems). While not shown explicitly in the system of FIG. 10, one or more communications interfaces facilitate information flow between the components of the system 1000. In some implementations, the communications interface(s) may be configured (e.g., via various hardware components or software components) to provide a website as an access portal to at least some aspects of the computer system 1000. Examples of communications interfaces 1005 include user interfaces (e.g., web pages), through which the user can communicate with the computer system 1000.

The output devices 1010 of the computer system 1000 shown in FIG. 10 may be provided, for example, to allow various information to be viewed or otherwise perceived in connection with execution of the instructions. The input device(s) 1015 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for classifying content across media formats based on weak supervision and cross-modal training, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method for classifying content across media formats based on weak supervision and cross-modal training, comprising:
    maintaining, by a data processing system comprising one or more processors and a memory, in a database, a first feature classifier that classifies features of content having a first media format, and a second feature classifier that classifies features of content having a second media format;
    extracting, by the data processing system, a first portion of content having the first media format and a second portion of content having the second media format from a content item;
    identifying, by the data processing system, a first feature in the first portion of content using the first feature classifier and a second feature in the second portion of content using the second feature classifier;
    constructing, by the data processing system, a feature space for the content item based on the first identified feature and the second identified feature;
    correlating, by the data processing system, a set of known labelled data to the feature space and aggregated content statistics to construct determinative training data;
    training, by the data processing system, a discrimination model using the content item and the determinative training data; and
    assigning, by the data processing system, a content policy to a second content item using the discrimination model to block presentation of the second content item in a context that does not satisfy the content policy.

2. The method of claim 1, wherein correlating the set of known labelled data to the feature space further comprises
    extracting, by the data processing system, a second feature space from a third content item using the first feature classifier and the second feature classifier;
    combining, by the data processing system, the second feature space with the first feature space to generate an aggregated feature space;

applying, by the data processing system, a set of conditional instructions to the content item to generate aggregated content metrics; and correlating, by the data processing system, the set of known labelled data to the aggregated feature space, the aggregated content metrics, and aggregated content statistics to construct the determinative training data.

3. The method of claim 1, wherein constructing the feature space further comprises:

extracting a first set of features from the content item using the first classification model;

extracting, by the data processing system, a second set of features from the content item using the second classification model; and constructing, by the data processing system, the feature space using the first set of features and the second set of features.

4. The method of claim 1, wherein maintaining the first feature classifier and the second feature classifier further comprises:

receiving, by the data processing system, first labelled training data having the first media format and associated with a first feature;

receiving, by the data processing system, second labelled training data having the second media format and associated with a second feature;

training, by the data processing system, the first feature classifier using the first labelled training data, and the second feature classifier using the second training data; and storing, by the data processing system, the first feature classifier and the second feature classifier in the database.

5. The method of claim 1, further comprising:

identifying, by the data processing system, a first text portion of the content item;

matching, by the data processing system, the first text portion of the content item to a set of conditional instructions to determine that a feature is present in the content item; and updating, by the data processing system, the feature space based on the determination that the feature is present in the content item.

6. The method of claim 1, wherein training the discrimination model further comprises:

constructing, by the data processing system, an input vector using the determinative training data;

associating, by the data processing system, the input vector with an expected output value;

propagating, by the data processing system, the input vector through the discrimination model to generate a training output value; and updating, by the data processing system, the discrimination model based on the difference between the training output value and the expected output value.

7. The method of claim 1, wherein constructing the feature space further comprises:

extracting, by the data processing system, text information from the content item using optical character recognition; and extracting, by the data processing system, the feature space responsive to applying the text information to the first feature classifier.

8. A system configured for classifying content across media formats based on weak supervision and cross-modal training, the system comprising:

a data processing system having one or more hardware processors and a memory, the data processing system configured to:

maintain, in a database, a first feature classifier that classifies features of content having a first media format, and a second feature classifier that classifies features of content having a second media format;

extract a first portion of content having the first media format and a second portion of content having the second media format from a content item;

identify a first feature in the first portion of content using the first feature classifier and a second feature in the second portion of content using the second feature classifier;

construct a feature space for the content item based on the first identified feature and the second identified feature;

correlate a set of known labelled data to the feature space, the content metrics, and aggregated content statistics to construct determinative training data;

train a discrimination model using the content item and the determinative training data; and assign a content policy a second content item using the discrimination model to block presentation of the second content item in a context that does not satisfy the content policy.

9. The system of claim 8, wherein the data processing system is further configured to:

extract a second feature space from a third content item using the first feature classifier and the second feature classifier;

combine the second feature space with the first feature space to generate an aggregated feature space;

apply a set of conditional instructions to the content item to determine aggregated content metrics; and wherein training the discrimination model further comprises correlating the set of known labelled data to the aggregated feature space the aggregated content metrics, and aggregated content statistics to construct the determinative training data.

10. The system of claim 8, wherein the data processing system is further configured to:

extract a first set of features from the content item using the first classification model;

extract a second set of features from the content item using the second classification model; and construct the feature space using the first set of features and the second set of features.

11. The system of claim 8, wherein the data processing system is further configured to:

receive first labelled training data having the first media format and associated with a first feature;

receive second labelled training data having the second media format and associated with a second feature;

train the first feature classifier using the first labelled training data, and the second feature classifier using the second training data; and store the first feature classifier and the second feature classifier in the database.

12. The system of claim 8, wherein the data processing system is further configured to:

identify a first text portion of the content item;

match the first text portion of the content item to a set of conditional instructions to determine that a feature is present in the content item; and update the feature space based on the determination that the feature is present in the content item.

13. The system of claim 8, wherein the data processing system is further configured to:
   construct an input vector using the determinative training data;
   associate the input vector with an expected output value;
   propagate the input vector through the discrimination model to generate a training output value; and
   update the discrimination model based on the difference between the training output value and the expected output value.

14. The system of claim 8, wherein the data processing system is further configured to:
   extract text information from the content item using optical character recognition; and
   extract the feature space responsive to applying the text information to the first feature classifier.

15. A non-transitory computer-readable storage medium comprising instructions executable by one or more processors to perform a method for classifying content across media formats based on weak supervision and cross-modal training, the method comprising:
   maintaining, in a database, a first feature classifier that classifies features of content having a first media format, and a second feature classifier that classifies features of content having a second media format;
   extracting a first portion of content having the first media format and a second portion of content having the second media format from a content item;
   identifying a first feature in the first portion of content using the first feature classifier and a second feature in the second portion of content using the second feature classifier;
   constructing a feature space for the content item based on the first identified feature and the second identified feature;
   correlating a set of known labelled data to the feature space, the content metrics, and aggregated content statistics to construct determinative training data;
   training a discrimination model using the content item and the determinative training data; and
   assigning a content policy to a second content item using the discrimination model to block presentation of the second content item in a context that does not satisfy the content policy.

16. The computer-readable storage medium of claim 15, wherein method described by the instructions further comprises:
   extracting a second feature space from a third content item using the first feature classifier and the second feature classifier;
   combining the second feature space with the first feature space to generate an aggregated feature space;
   applying a set of conditional instructions to the content item to determine aggregated content metrics; and
   correlating the set of known labelled data to the aggregated feature space, the aggregated content metrics, and aggregated content statistics to construct the determinative training data.

17. The computer-readable storage medium of claim 15, wherein method described by the instructions further comprises:
   extracting a first set of features from the content item using the first classification model;
   extracting a second set of features from the content item using the second classification model; and
   constructing the feature space using the first set of features and the second set of features.

18. The computer-readable storage medium of claim 15, wherein method described by the instructions further comprises:
   receiving first labelled training data having the first media format and associated with a first feature;
   receiving second labelled training data having the second media format and associated with a second feature;
   training the first feature classifier using the first labelled training data, and the second feature classifier using the second training data; and
   storing the first feature classifier and the second feature classifier in the database.

19. The computer-readable storage medium of claim 15, wherein method described by the instructions further comprises:
   identifying a first text portion of the content item;
   matching the first text portion of the content item to a set of conditional instructions to determine that a feature is present in the content item; and
   updating the feature space based on the determination that the feature is present in the content item.

20. The computer-readable storage medium of claim 15, wherein method described by the instructions further comprises:
   constructing an input vector using the determinative training data;
   associating the input vector with an expected output value;
   propagating the input vector through the discrimination model to generate a training output value; and
   updating the discrimination model based on the difference between the training output value and the expected output value.

* * * * *